United States Patent [19]

Iga et al.

[11] Patent Number: 5,739,742
[45] Date of Patent: Apr. 14, 1998

[54] ZINC OXIDE CERAMICS AND METHOD FOR PRODUCING THE SAME AND ZINC OXIDE VARISTORS

[75] Inventors: Atsushi Iga; Masahiro Ito; Masakazu Tanahashi, all of Osaka, Japan

[73] Assignee: Matsushita Electric Industrial Co., Ltd., Osaka, Japan

[21] Appl. No.: 705,129

[22] Filed: Aug. 29, 1996

[30] Foreign Application Priority Data

Aug. 31, 1995 [JP] Japan ................................. 7-223674
May 23, 1996 [JP] Japan ................................. 8-128859

[51] Int. Cl.$^6$ ............................... H01C 7/10; H01C 7/13
[52] U.S. Cl. ............................................. 338/21; 264/617
[58] Field of Search ........................ 338/21, 20; 264/614, 264/617; 427/101, 126.2, 419.2, 419.3

[56] References Cited

U.S. PATENT DOCUMENTS

| | | |
|---|---|---|
| 4,111,852 | 9/1978 | Ho et al. . |
| 4,180,483 | 12/1979 | Ho et al. . |
| 5,004,573 | 4/1991 | Oh et al. . |

FOREIGN PATENT DOCUMENTS

| | | |
|---|---|---|
| 0 070 468 | 1/1983 | European Pat. Off. . |
| 0 472 259 | 2/1992 | European Pat. Off. . |
| 0 473 419 | 3/1992 | European Pat. Off. . |
| 0 597 566 | 8/1992 | European Pat. Off. . |
| 59-29402 | 2/1984 | Japan . |
| 60-28203 | 2/1985 | Japan . |
| 60-233801 | 11/1985 | Japan . |
| 2242065 | 9/1991 | United Kingdom . |

OTHER PUBLICATIONS

Matsuoka, "Nonohmic Properties of Zinc Oxide Ceramic" Japanese Journal of Applied Physics, vol. 10, No. 6, pp. 736–746, Jun. 1971.

Chen et al., "Grain Growth Processes in Zno Varistors with Various Velence States of Manganese and Cobalt" Journal of Applied Physics, 69, pp. 8363–8367, Jun. 1991.

*Primary Examiner*—Edward Tso
*Attorney, Agent, or Firm*—Merchant, Gould, Smith, Edell, Welter & Schmidt, P.A.

[57] ABSTRACT

A zinc oxide ceramic and a method for producing the zinc oxide ceramics are provided wherein a zinc oxide varistor for a high voltage which has excellent electric characteristics and great reliability for DC loading and surge can be produced in high yield by performing sintering at a temperature of 750° to 1050° C. At least one of $B_2O_3$, $Cr_2O_3$, $GeO_2$, $LaO_3$, $MgO$, $Nb_2O_5$, $Nd_2O_3$, $PbO$, $PrO$, $Sb_2O_3$, $SiO_2$, $SnO_2$, $Ta_2O_5$, $WO_3$ and $Y_2O_3$ powders and a $Bi_2O_3$ powder are mixed. A mixture thus obtained is heat treated at a temperature of 400° to 700° C. and ground to prepare a synthetic powder. 0.5 to 20 parts by weight of the synthetic powder and 0.1 to 5.0 parts by weight of at least one of $CoO$, $MnO_2$ and $NiO$ powders are added and ground for 100 parts by weight of a zinc oxide powder. A binder is added to the ground powder to form a sheet. A silver paste is applied to the surface of the sheet to laminate four sheets. A lamination is integrally sintered at a temperature of 840° C. A zinc oxide varistor of a lamination type comprises an internal silver electrode, an internal silver counter electrode, an effective layer, a noneffective layer, and an external silver electrode.

25 Claims, 2 Drawing Sheets

ZINC OXIDE CERAMICS AND METHOD FOR PRODUCING THE SAME AND ZINC OXIDE VARISTORS

FIELD OF THE INVENTION

The present invention relates to a zinc oxide ceramic and a method for producing the same, and more particularly to a zinc oxide ceramic and a method for producing the same for fabricating a zinc oxide varistor to be used for surge absorption in an electric circuit.

BACKGROUND OF THE INVENTION

A zinc oxide (ZnO) varistor is produced by using zinc oxide ceramics (a sintered body) which are obtained by sintering a zinc oxide powder material that contains zinc oxide, bismuth oxide, manganese oxide and cobalt oxide as basic additives, and various oxides to be added for performance enhancement. It has been known that the threshold voltage of the zinc oxide varistor is almost proportional to the number of grain boundaries which are present between electrodes. More specifically, the threshold voltage rises by 3V to 4V per grain boundary. Accordingly, it is necessary to produce a sintered body having ZnO particles whose average particle size is about 4 to 40 μm in order to fabricate the zinc oxide varistor for a high voltage. In order to produce the zinc oxide varistor for a high voltage, a method for adding a growth inhibitor such as antimony oxide ($Sb_2O_3$) to inhibit the growth of ZnO particles has conventionally been used.

The threshold voltage means a voltage between terminals from which a current of 1 mA flows to a varistor, and is represented by $V_{1mA}$. A voltage between the terminals from which a current of 1 mA flows to a sample having a thickness of 1 mm is one of material constants, and is represented by $V_{1mA/mm}$, which is a threshold voltage for a sample thickness of 1 mm.

However, a sintering temperature of 1150° to 1300° C. is required to obtain a high-performance zinc oxide varistor for a high voltage. The high sintering temperature causes power to be consumed, bismuth oxide to be strongly scattered, and a furnace material or container to be wasted due to the strong scattering of bismuth oxide. Consequently, it has been desired that the sintering temperature be decreased. If sintering is performed at a high temperature, the bismuth oxide or the like evaporates actively in the air. In addition, the bismuth oxide easily reacts with many materials, and readily erodes a lot of materials such as ceramics, for example, a furnace material, a container and the like. Depending on the place in a furnace where the sample is placed, temperature, and temperature rising rate, the vapor pressures of $Bi_2O_3$ and $Sb_2O_3$ and the like have variations which are hard to keep uniform.

If the sintering temperature is decreased by the blending of the zinc oxide ceramics for producing a zinc oxide varistor according to the prior art, sintering is not fully performed so that the threshold voltage is rapidly increased so that the irregularity of a ZnO particle size is caused. Consequently, the non-linear resistance characteristics are deteriorated. Further, the life for power loading, pulse current loading or the like is shortened.

In the method according to the prior art, all blended components such as bismuth oxide, antimony oxide, chromium oxide, boron oxide and the like are exactly mixed with the zinc oxide powder material. For this reason, a complicated reaction occurs so that there is a portion in which antimony oxide first reacts with zinc oxide, a portion in which bismuth oxide first reacts with antimony oxide, and the like. Although boron oxide is used to decrease a sintering temperature, it tends to form a liquid phase and coalesces at the early stage of the temperature increase to cause variations in quality. In particular, antimony oxide is easily sublimated to cover the surface of zinc oxide particles and react with zinc oxide so that grain growth is inhibited. As a result, the sintered body has a portion in which the grain growth is not promoted and a portion in which the grain growth is promoted. In the method according to the prior art, thus, it is difficult to produce a sintered body having a regular particle size. Accordingly, the quality between batches (lots) becomes non-uniform and varies easily.

Zinc oxide—bismuth oxide, which are basic compositions of ZnO varistor ceramics, have eutectic compositions having an eutectic temperature of 740° C. Consequently, they react with each other easily. Some additives block such reaction. In the case where the additive itself blocks the contact of zinc oxide with bismuth oxide, the additive reacts with zinc oxide to form a chemically stable material. The latter examples are $Zn_2SnO_4$, $Zn_2SiO_4$, $Zn_2TiO_4$, $Zn_2GeO_4$, $Cr_2ZnO_4$, $Mn_2ZnO_4$, $Zn_3Nb_2O_8$ and the like.

Furthermore, it is hard to fully control the abnormal grain growth of ZnO. Therefore, there is a problem that the electric characteristics and reliability of zinc oxide varistors obtained from a given production batch have a great variation (which occurs within the batch). In addition, there is a problem that the electric characteristics and reliability of zinc oxide varistors obtained from different producing batches have a great variation (which occurs between the batches).

As described above, it is impossible to stably produce a zinc oxide varistor having excellent electric characteristics and great reliability with low-temperature sintering by the method using the ceramics according to the prior art.

The excellent electric characteristics of the zinc oxide varistor means that a leakage current is hardly generated and a non-linear resistance index $_{0.1mA}\alpha_{1mA}$ described below is high. Also in the cases where a voltage is applied for a long time, a power is loaded for a long time at a high temperature or a pulse is applied, the electric characteristics are not deteriorated. Thus, reliability can be obtained.

SUMMARY OF THE INVENTION

It is an object of the present invention to provide a zinc oxide ceramic and a method for producing the zinc oxide ceramic for producing, in high yield, zinc oxide varistors having electric characteristics such as non-linear resistance characteristics and great reliability with low-temperature sintering.

In order to achieve the above-mentioned object, the present invention provides a zinc oxide ceramic wherein at least one of boron oxide ($B_2O_3$), chromium oxide ($Cr_2O_3$), germanium oxide ($GeO_2$), lanthanum oxide ($La_2O_3$), magnesium oxide (MgO), niobium oxide ($Nb_2O_5$), neodymium oxide ($Nd_2O_3$), lead oxide (PbO), praseodymium oxide (PrO), antimony oxide ($Sb_2O_3$), silicon oxide ($SiO_2$), tin oxide ($SnO_2$), tantalum oxide ($Ta_2O_5$), tungsten oxide ($WO_3$) and yttrium oxide ($Y_2O_3$) powders is mixed with a bismuth oxide ($Bi_2O_3$) powder, and the mixture thus obtained is heat treated preliminarily and ground (pulverized) to prepare a synthetic powder. 0.5 to 20 parts by weight of the synthetic powder and 0.1 to 5.0 parts by weight of at least one of nickel oxide, cobalt oxide and manganese oxide powders are added and sintered with 100 parts by weight of a zinc oxide powder.

It is preferable that a part of the zinc oxide should be replaced with magnesium oxide.

It is preferable that 0.00062 to 0.372 part by weight of aluminum components should be present for 100 parts by weight of the zinc oxide powder, based on aluminum oxide conversion.

It is preferable that 0.00062 to 0.372 part by weight of aluminum components should be present for 100 parts by weight of a mixture of the zinc oxide powder and the magnesium oxide powder, based on aluminum oxide conversion.

It is preferable that a preliminary heat treating temperature should be 400° to 700° C.

It is preferable that the synthetic powder should be produced by heat treating a mixture of the bismuth oxide powder and the chromium oxide powder preliminarily.

It is preferable that a molar ratio of the chromium oxide powder to the bismuth oxide powder in the synthetic powder should be 1:1 or more.

It is preferable that the synthetic powder should contain a bismuth oxide powder (A) and a boron compound (B) selected from boron oxide ($B_2O_3$) and boric acid ($H_3BO_3$).

It is preferable that a molar ratio of the bismuth oxide powder (A) to the boron compound (B) selected from boron oxide ($B_2O_3$) and boric acid ($H_3BO_3$) in the synthetic powder should be 80:20 to 20:80.

A mixture of boron oxide ($B_2O_3$) and a bismuth oxide ($Bi_2O_3$) powder, a mixture of chromium oxide ($Cr_2O_3$) and the bismuth oxide ($Bi_2O_3$) powder, a mixture of germanium oxide ($GeO_2$) and the bismuth oxide ($Bi_2O_3$) powder, a mixture of lanthanum oxide ($La_2O_3$) and the bismuth oxide ($Bi_2O_3$) powder, a mixture of magnesium oxide (MgO) and the bismuth oxide ($Bi_2O_3$) powder, a mixture of niobium oxide ($Nb_2O_5$) and the bismuth oxide ($Bi_2O_3$) powder, a mixture of neodymium oxide ($Nd_2O_3$) and the bismuth oxide ($Bi_2O_3$) powder, a mixture of lead oxide (PbO) and the bismuth oxide ($Bi_2O_3$) powder, a mixture of praseodymium oxide (PrO) and the bismuth oxide ($Bi_2O_3$) powder, a mixture of antimony oxide ($Sb_2O_3$) and the bismuth oxide ($Bi_2O_3$) powder, a mixture of silicon oxide ($SiO_2$) and the bismuth oxide ($Bi_2O_3$) powder, a mixture of tin oxide ($SnO_2$) and the bismuth oxide ($Bi_2O_3$) powder, a mixture of tantalum oxide ($Ta_2O_5$) and the bismuth oxide ($Bi_2O_3$) powder, a mixture of tungsten oxide ($WO_3$) and the bismuth oxide ($Bi_2O_3$) powder, and a mixture of yttrium oxide ($Y_2O_3$) and the bismuth oxide ($Bi_2O_3$) powder are heat treated at a temperature of 400° to 700° C, respectively. For 100 parts by weight of zinc oxide, 0.5 to 20 parts by weight of at least one synthetic powder or a synthetic powder produced from a mixed synthetic powder and 0.1 to 5.0 parts by weight of at least one of nickel oxide, cobalt oxide and manganese oxide are added to obtain zinc oxide ceramics. When sintering the zinc oxide ceramics, it is possible to relieve the function of preventing the sintering of the zinc oxide powder due to boron oxide ($B_2O_3$), chromium oxide ($Cr_2O_3$), germanium oxide ($GeO_2$), lanthanum oxide ($La_2O_3$), magnesium oxide (MgO), niobium oxide ($Nb_2O_5$), neodymium oxide ($Nd_2O_3$), lead oxide (PbO), praseodymium oxide (PrO), antimony oxide ($Sb_2O_3$), silicon oxide ($SiO_2$), tin oxide ($SnO_2$), tantalum oxide ($Ta_2O_5$), tungsten oxide ($WO_3$), yttrium oxide ($Y_2O_3$) and the like. Consequently, the sintering can be performed fully at a lower temperature to obtain a sintered body having a uniform particle size. Thus, it is possible to provide zinc oxide ceramics which can produce, in high yield, a zinc oxide varistor having excellent electric characteristics such as non-linear resistance characteristics and great reliability by low-temperature sintering.

Furthermore, it is preferable that a zinc oxide ceramic according to the present invention should contain 0.00062 to 0.372 part by weight of aluminum components for 100 parts by weight of a zinc oxide powder, based on aluminum oxide conversion. In this example, the added aluminum components form a solution with ZnO particles to serve as a donor of a semiconductor. Consequently, the electric resistance of ZnO can be lowered to a desired extent without damaging other electric characteristics. Thus, it is possible to provide zinc oxide ceramics suitable for enhancing the non-linear resistance characteristics of a varistor in a high current region.

The present invention provides a method for producing a zinc oxide ceramic comprising the steps of mixing at least one of boron oxide ($B_2O_3$), chromium oxide ($Cr_2O_3$), germanium oxide ($GeO_2$), lanthanum oxide ($La_2O_3$), magnesium oxide (MgO), niobium oxide ($Nb_2O_5$), neodymium oxide ($Nd_2O_3$), lead oxide (PbO), praseodymium oxide (PrO), antimony oxide ($Sb_2O_3$), silicon oxide ($SiO_2$), tin oxide ($SnO_2$), tantalum oxide ($Ta_2O_5$), tungsten oxide ($WO_3$) and yttrium oxide ($Y_2O_3$) powders with a bismuth oxide ($Bi_2O_3$) powder; preliminarily heat treating the mixture at a temperature of 400° to 700° C.; grinding the heat treated mixture to prepare a synthetic powder or a mixed synthetic powder; and adding 0.5 to 20 parts by weight of the synthetic powder and 0.1 to 5.0 parts by weight of at least one of nickel oxide, cobalt oxide and manganese oxide powders for 100 parts by weight of zinc oxide.

It is preferable that the method should further comprise the step of adding magnesium oxide to zinc oxide prior to adding the synthetic powder to obtain a zinc oxide—magnesium oxide mixed powder.

It is preferable that the method further should comprise the step of including the aluminum components by using 0.00062 to 0.372 part by weight of an aluminum salt solution for 100 parts by weight of the zinc oxide powder or 100 parts by weight of a mixture of the zinc oxide powder and magnesium oxide powder, based on aluminum oxide conversion.

It is preferable that the synthetic powder should be obtained by heat treating the mixture of the bismuth oxide powder, the antimony oxide powder and at least one of boron oxide ($B_2O_3$) and boric acid ($H_3BO_3$) powders at a temperature of 400° to 700° C.

It is preferable that the synthetic powder should be obtained by heat treating the mixture of the bismuth oxide powder, the antimony oxide powder and the chromium oxide powder at a temperature of 400° to 700° C.

It is preferable that the synthetic powder should be obtained by heat treating the mixture of the bismuth oxide powder, the antimony oxide powder, the chromium oxide powder, and at least one of the boron oxide ($B_2O_3$) powder and the boric acid ($H_3BO_3$) powder at a temperature of 400° to 700° C.

It is preferable that two kinds of synthetic powders should be obtained by heat treating the mixture of the bismuth oxide powder and the antimony oxide powder at a temperature of 400° to 700° C. to be ground and by heat treating the mixture of the bismuth oxide powder and at least one of the boron oxide ($B_2O_3$) powder and the boric acid ($H_3BO_3$) powder at a temperature of 400° to 700° C.

It is preferable that two kinds of synthetic powders should be obtained by heat treating the mixture of the bismuth oxide powder and the antimony oxide powder at a temperature of 400° to 700° C so as to be ground and by heat treating the mixture of the bismuth oxide powder and the chromium oxide powder at a temperature of 400° to 700° C.

It is preferable that three kinds of synthetic powders should be obtained by heat treating the mixture of the bismuth oxide powder and the antimony oxide powder at a temperature of 400° to 700° C. so as to be ground, by heat treating the mixture of the bismuth oxide powder and at least one of the boron oxide ($B_2O_3$) powder and the boric acid ($H_3BO_3$) powder at a temperature of 400° to 700° C. so as to be ground, and by heat treating the mixture of the bismuth oxide powder and the chromium oxide powder at a temperature of 400° to 700° C. to be ground.

It is preferable that two kinds of synthetic powders should be obtained by heat treating the mixture of the bismuth oxide powder, the antimony oxide powder and the chromium oxide powder at a temperature of 400° to 700° C. so as to be ground, and by heat treating the mixture of the bismuth oxide powder and at least one of the boron oxide ($B_2O_3$) powder and the boric acid ($H_3BO_3$) powder at a temperature of 400° to 700° C. so as to be ground.

It is preferable that two kinds of synthetic powders should be obtained by heat treating the mixture of the bismuth oxide powder, the antimony oxide powder and at least one of the boron oxide ($B_2O_3$) powder and the boric acid ($H_3BO_3$) powder at a temperature of 400° to 700° C. so as to be ground, and by heat treating the mixture of the bismuth oxide powder and the chromium oxide powder at a temperature of 400° to 700° C. to be ground.

It is preferable that two kinds of synthetic powders should be obtained by heat treating the mixture of the bismuth oxide powder and the antimony oxide powder at a temperature of 400° to 700° C. to be ground, and by heat treating the mixture of the bismuth oxide powder, the chromium oxide powder and at least one of the boron oxide ($B_2O_3$) powder and the boric acid ($H_3BO_3$) powder at a temperature of 400° to 700° C. so as to be ground.

It is preferable that 0.00062 to 0.372 part by weight of aluminum components should be added, for 100 parts by weight of a zinc oxide varistor, based on aluminum oxide conversion, to the powder material whose main component is the zinc oxide powder to which the synthetic powder is added.

It is preferable that a molar ratio of the chromium oxide powder to the bismuth oxide powder in the synthetic powder obtained by heat treating the mixture of the bismuth oxide powder and the chromium oxide powder at a temperature of 400° to 700° C. should be 1:1 or more.

It is preferable that a molar ratio of the bismuth oxide powder to at least one of the boron oxide ($B_2O_3$) powder and the boric acid ($H_3BO_3$) powder should be 80:20 to 20:80 in the synthetic powder obtained by heat treating the mixture of the bismuth oxide powder and at least one of the boron oxide ($B_2O_3$) powder and the boric acid ($H_3BO_3$) powder at a temperature of 400° to 700° C.

The present invention provides a zinc oxide varistor wherein at least one of boron oxide ($B_2O_3$), chromium oxide($Cr_2O_3$), germanium oxide ($GeO_2$), lanthanum oxide ($La_2O_3$), magnesium oxide (MgO), niobium oxide ($Nb_2O_5$), neodymium oxide ($Nd_2O_3$), lead oxide (PbO), praseodymium oxide (PrO), antimony oxide ($Sb_2O_3$), silicon oxide ($SiO_2$), tin oxide ($SnO_2$), tantalum oxide ($Ta_2O_5$), tungsten oxide ($NO_3$) and yttrium oxide ($Y_2O_3$) powder is mixed with a bismuth oxide ($Bi_2O_3$) powder, and the mixture thus obtained is heat treated preliminarily and ground to prepare a synthetic powder. 0.5 to 20 parts by weight of the synthetic powder and 0.1 to 5.0 parts by weight of at least one of nickel oxide, cobalt oxide and manganese oxide are added and sintered for 100 parts by weight of a zinc oxide powder.

It is preferable that silver should be integrally sintered as an internal electrode for the varistor.

According to the above-mentioned method, it is preferable that 0.00062 to 0.372 part by weight of aluminum components should be added for 100 parts by weight of a zinc oxide powder, based on aluminum oxide conversion. In this example, the added aluminum components form a solution with ZnO particles to serve as a donor of a semiconductor. Consequently, the electric resistance of ZnO can be lowered to a desired extent without damaging other electric characteristics. Thus, it is possible to provide zinc oxide ceramics suitable for enhancing the non-linear resistance characteristics of a varistor in a high current region.

According to the present invention, the zinc oxide ceramics are varistors. In the varistor, it is preferable that silver should be integrally sintered as an internal electrode of the varistor. Furthermore, it is preferable that the varistor should be selected from varistors of a lamination type and a disk type.

As described above, the present invention can provide zinc oxide ceramics that can manufacture a zinc oxide varistor having excellent electric characteristics such as non-linear resistance characteristics at low-temperature sintering and great reliability in high yield.

The zinc oxide ceramics according to the present invention can uniformly promote the growth of zinc oxide particles even though the a sintering temperature is lowered to 750° to 1050° C. A sintered body of the zinc oxide particles which has small particle size distribution is obtained. As a result, it is possible to manufacture the zinc oxide varistor having excellent electric characteristics and reliability in high yield. The zinc oxide ceramics of the present invention can be sintered at a low temperature. Consequently, the consumed power can be reduced during sintering and a material for an electric furnace and a container used for sintering are hardly worn, thus reducing energy consumption and resource consumption.

It was found that an electrode having silver as a main component can be formed when sintering ceramics. Consequently, a silver electrode could be formed in ZnO ceramics. Thus, a ZnO varistor of a lamination type could be produced in which the silver is an internal electrode.

Furthermore, the present invention can provide a method for producing zinc oxide ceramics, in which zinc oxide ceramics that can produce the excellent effects are produced efficiently and reasonably.

DETAILED DESCRIPTION OF THE INVENTION

Figure 1:
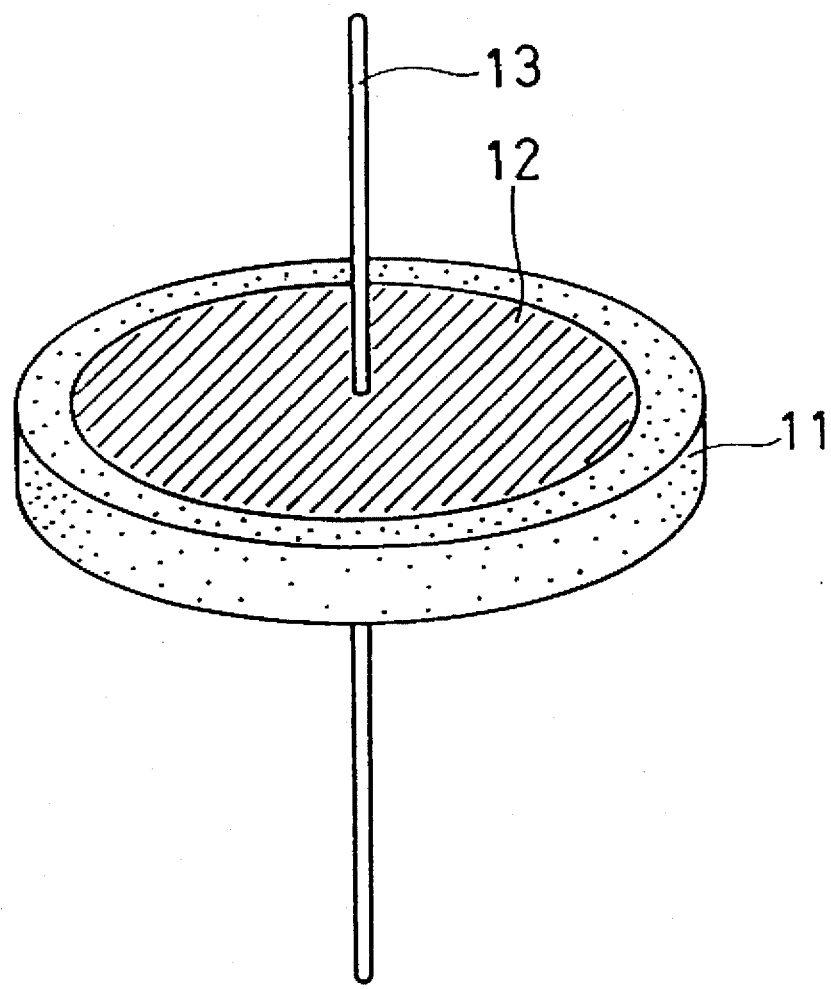
FIG. 1 is a schematically perspective view showing a zinc oxide varistor of a disk type produced by using zinc oxide ceramics according to Example 1 of the present invention.

According to the present invention, the action of zinc oxide which acts as a main component and additives which react with the zinc oxide has been analyzed in detail. As a result, it has been found that a material for a zinc oxide sintered body is classified as follows.

(1) Zinc oxide (ZnO)

(2) An oxide which easily fuses into the zinc oxide (a small amount of NiO, MgO, CoO, MnO, a very small amount of $Al_2O_3$)

(3) An oxide which fuses into the zinc oxide with difficulty, forms a liquid phase at a high temperature, and exists between ZnO particles to control grain growth.

The zinc oxide in (1) is produced by evaporating and oxidizing zinc metal in the air, and has high purity and fineness and very great reactivity. Accordingly, it is preferable that the zinc oxide should be used as a material.

If iron family oxide and magnesium oxide in (2) have fine particles, they react with ZnO particles at a temperature of 800° C. or less and form a solution with the zinc oxide. A very small amount of $Al_2O_3$ forms a solution with ZnO. In other words, the materials in (2) have fine particles. Therefore, if they are mixed uniformly, sintering is not disturbed. Accordingly, the various kinds of oxides in (3) are more apt to cause problems.

Originally, eutectic having a temperature of about 740° C. exists in a $Bi_2O_3$—rich region between ZnO and $Bi_2O_3$. Therefore, ZnO reacts with $Bi_2O_3$ easily. However, the existence of the additives in (3) makes the reaction complicated so that a variation or the like is caused.

Some additives in (3) react with ZnO to form a compound and disturb the grain growth of ZnO on the grain boundary. In addition, they fuse into $Bi_2O_3$ to form a liquid phase therewith so that liquid phase sintering is promoted on the grain boundary. It is preferable that they should react with $Bi_2O_3$ in advance if they form a liquid phase at a high temperature. Consequently, it is possible to prevent the bad influence of the reaction of the additives (3). As a result, it is expected that the variation is considerably reduced. Furthermore, the grain growth is not disturbed on the grain boundary and the sintering is promoted at a low temperature. In addition, the eutectic of bismuth oxide and zinc oxide is hardly influenced even if a small amount of oxide forms a solution with bismuth oxide.

In case of sintering, it is preferable that zinc oxide ceramics according to the present invention should be compressed and molded into a predetermined shape and a molded body thus obtained should be sintered at a temperature of about 750° to 1100° C. By performing sintering at a temperature having this range, a zinc oxide varistor having excellent electric characteristics such as non-linear resistance characteristics and great reliability can be produced in high yield.

The zinc oxide ceramics include a sintered body having excellent electric characteristics which is sintered at a temperature of 900° C. or less. These zinc oxide ceramics are molded like a sheet, alternately laminated with electrode materials, and sintered. Then, electrodes are connected by a predetermined connecting method. Thus, a varistor of a laminated type is obtained. In the prior art, the sintering temperature should be set to 1200° C. or more in order to form the varistor of a lamination type having excellent characteristics. In that case, a noble metal such as platinum is used as the electrode material. In the case where zinc oxide ceramics which can be sintered at a temperature of 900° C. or less are used, silver sold at a low price can be used as the electrode material. This will greatly contribute to the spread of varistors. One of the advantages of the present invention is that silver can be sintered integrally as an internal electrode of the varistor.

In order to enhance the non-linear resistance characteristics in a high current region, aluminum salt is often added to ZnO varistors. The amount of addition is determined depending on the application of the varistors. According to the examples, 0.0013 g of aluminum salt is uniformly added to 1 mol of ZnO. In order to improve the non-linear resistance characteristics in the high current region, the amount of alumina to be added is increased. In order to reduce a leakage current in a low current region, the amount of alumina to be added is reduced.

The effects of the addition of bismuth oxide ($Bi_2O_3$)—manganese oxide (MnO), bismuth oxide ($Bi_2O_3$)—cobalt oxide (CoO) and bismuth oxide ($Bi_2O_3$)—nickel oxide (NiO) have been investigated. As compared with the case where untreated manganese oxide (MnO), cobalt oxide (CoO) and nickel oxide (NiO) are added, remarkable effects were not produced.

In the zinc oxide ceramics and the method for producing the zinc oxide ceramics according to the present invention, 0.5 to 20 parts by weight of a synthetic powder which is prepared by heat treating and grinding at least bismuth oxide and antimony oxide and 0.1 to 5 parts by weight of at least one of a cobalt oxide powder and a manganese oxide powder are added for 100 parts by weight of a zinc oxide powder.

Boron oxide, chromium oxide and the like may be added to the synthetic powder besides bismuth oxide and antimony oxide if necessary.

Cobalt oxide (CoO or $Co_3O_4$) can suitably be used. Manganese oxide (MnO, $Mn_2O_3$ or $MnO_2$) can suitably be used. Manganese carbonate ($MnCO_3$) which is changed to manganese oxide by thermal decomposition at a high temperature can also be used suitably. Cobalt and manganese components form a solution with zinc oxide, a part of which is on the grain boundary of zinc oxide particles so that a depletion layer is formed. Consequently, the non-linear resistance value $_{0.1m}\alpha_{1mA}$ can be increased.

Boron oxide, chromium oxide and the like may be added to the synthetic powder besides bismuth oxide and antimony oxide if necessary.

It is preferable that the synthetic powder should have an average particle size of 0.5 to 10 μm. In particular, the average particle size of 1 μm or less is preferable. However, it takes a significant amount of time to perform grinding.

According to the present invention, it is preferable that the amount of bismuth components to be added is 0.49 to 19.99 parts by weight, based on $Bi_2O_3$ conversion, for 100 parts by weight of zinc oxide.

With the above-mentioned structure, it is preferable that the amount of chromium components to be added should be 0.005 to 0.5 part by weight, based on $Cr_2O_3$ conversion, for 100 parts by weight of zinc oxide.

In the present invention, boron oxide or boric acid can suitably be used. It is preferable that the amount of boron components to be added should be 0.002 to 1.000 part by weight, based on $B_2O_3$ conversion, for 100 parts by weight of zinc oxide.

According to the present invention, it is preferable that 0.00062 to 0.372 part by weight of aluminum components should be added, based on aluminum oxide ($Al_2O_3$) conversion, for 100 parts by weight of a zinc oxide powder.

In the method for producing zinc oxide ceramics according to the present invention, ceramics which contain at least bismuth oxide and antimony oxide are heat treated and ground to prepare a synthetic powder, and the synthetic powder is added to a powder material which contains zinc oxide as a first component and at least one of cobalt oxide and manganese oxide as a second component to prepare a blended powder. The powder material containing at least zinc oxide as a first component and a second component selected from cobalt oxide and manganese oxide, maybe a ground powder. In addition to the first and second components, Ni, Mg, Si, Ti, Ta, Ge, Nb and the like maybe contained. The blended powder is a mixture of the synthetic powder and the powder material.

In the method for producing zinc oxide ceramics according to the present invention, in the case where two kinds of synthetic powders described above are used, the synthetic powders may be heat treated and individually ground or the powders thus heat treated maybe simultaneously ground.

In the method for producing zinc oxide ceramics according to the present invention, it is preferable that respective material mixtures for synthetic powders should be heat treated at a temperature of 400° to 700° C and ground to prepare three kinds of synthetic powders, and first to third synthetic powders should be mixed and added to the powder material to prepare a blended powder. At the step of grinding the synthetic powder, a heat-treated product for the third synthetic powder maybe solely ground and mixed with the ground heat-treated products for the first and second synthetic powders, maybe ground simultaneously with the heat treated products for synthetic powders or may be ground individually.

In the case where the synthetic powder is prepared, a heat treating temperature should be 400° to 700° C. If the heat treating temperature is less than 400° to 700° C., each component forming the synthetic powder does not react sufficiently. Accordingly, it is impossible to produce the effects seen when heat treatment is performed in advance to prepare a synthetic powder. In other words, if the heat treating temperature is less than 400° C., it is hard to control the zinc oxide grain growth so that a sintered body having regular particle sizes and uniform quality cannot be manufactured at a low temperature. If the heat treating temperature is too high, it is hard to perform grinding because of hardness. Practically, a heat treating time of 10 mins. to 5 hrs. is preferred.

In the case where the zinc oxide ceramics according to the present invention are produced, it is preferable that the method should further comprise the step of adding the synthetic powder to the power material and then grinding them.

According to the zinc oxide ceramics of the present invention, a mixture which contains at least bismuth oxide and antimony oxide is heat treated and ground to prepare a synthetic powder, and 0.5 to 20 parts by weight of the synthetic powder and 0.1 to 5 parts by weight of at least one of a cobalt oxide powder and a manganese oxide powder are added for 100 parts by weight of a zinc oxide powder. Consequently, it is possible to obtain the ceramics which can be sintered at a temperature of 1100° C. or less, which is lower than a sintering temperature of 1200° to 1300° C. according to the prior art. In the case where 0.5 parts by weight of a synthetic powder or less is added for 100 parts by weight of a zinc oxide powder, a zinc oxide varistor which is obtained has a low threshold voltage and the absolute value of the rate of change in the threshold voltage is great for long-time DC loading and surge. In addition, a variation in electric characteristics is great. In general, a plurality of sample molded bodies are superposed and placed in a sintering furnace for sintering to produce the zinc oxide varistor in such a manner that the consumed energy is reduced and more samples can be sintered. However, if the amount of the synthetic powders to be added exceeds 20 parts by weight, the samples stick together during sintering. Consequently, it is hard to produce the desired zinc oxide varistor. In order to obtain a sintered body having a uniform particle size, it is preferable that the average particle size of the synthetic powder is 0.05 to 100 μm. Furthermore, the powder material containing a zinc oxide powder and the like which has an average particle size of 0.05 to 5.0 μm can suitably be used.

In the case where the synthetic powder which is obtained by heat treating the mixture of the bismuth oxide powder and the chromium oxide powder at a temperature of 400° to 700° C. so as to be ground is used, it is preferable that the molar ratio of the chromium oxide powder to the bismuth oxide powder should be 1:1 or more because it is possible to prevent hazardous chromium (VI) from being easily generated as in the case of synthesis in which the amount of $Bi_2O_3$ is greater than that of $Cr_2O_3$. In the case where only the bismuth oxide and the chromium oxide are contained, the preferred molar ratio is 25:75.

It is preferable that the zinc oxide ceramics of the present invention should are compressed and molded into a predetermined shape and sintered at a temperature of 750° to 1100° C. By the sintering at the temperature having this range, it is possible to manufacture a zinc oxide varistor having excellent electric characteristics such as non-linear resistance characteristics and great reliability in high yield.
Preferred Embodiments The present invention will be described in detail with reference to examples. In the following examples, there are cases where "weight" is represented by "wt".
(Example 1)

Bismuth oxide ($Bi_2O_3$) powder and tin oxide ($SnO_2$) powder (whose average particle sizes are about 2 to 3 μm) were blended at a weight ratio of 92:8. The blended powder was heat treated for 5 hrs. at a temperature of 600° C. in the air, and then ground fine by means of stabilizing zirconia balls in a monomalon pot. Consequently, a synthetic powder (whose average particle size is about 0.5 to 1.5 μm) was obtained. The synthetic powder which is prepared from bismuth oxide and tin oxide is called a bismuth oxide/tin oxide synthetic powder.

A zinc oxide (ZnO) powder (whose average particle size is 0.3 μm), the bismuth oxide/tin oxide synthetic powder, a cobalt oxide (CoO) powder (whose average particle size is about 0.5 to 1.5 μm), a manganese dioxide ($MnO_2$) powder (whose average particle size is about 2 to 3 μm), and nickel oxide (NiO) powder (whose average particle size is about 0.5 to 1.5 μm) were blended at a weight ratio of 100:0.1 to 20.0:0.954:0.414:0.383 while changing the amount of the bismuth oxide/tin oxide synthetic powder. The blended powder was mixed and ground for 18 hrs. so as to pass through a 325-mesh screen by a wet method by means of stabilizing zirconia balls in the monomalon pot. The ground powder was dried, and compressed and molded into a disk. The temperature of the molded product thus obtained is raised at a rate of 50° C./hr in the air, held for 17 hrs. at a temperature of 900° C. and cooled at a rate of 50° C./hr. Consequently, a sintered body was obtained. The sintered body had a thickness of 1.2 mm and a diameter of 14 mm.

A method for producing a zinc oxide varistor will be described below with reference to FIG. 1. FIG. 1 is a schematically perspective view showing a zinc oxide varistor 10 of a disk type produced with zinc oxide ceramics according to the present invention. Aluminum was sprayed on both sides of a sintered body 11 to form an aluminum layer (not shown). Then, copper was sprayed on the aluminum layer to form an electrode 12. A lead wire 13 was bonded to the electrode 12 by a solder. Then, the portions of the molded product other than the lead wire 13 were coated with an epoxy resin. Thus, the zinc oxide varistor was obtained.

The electric characteristics of the zinc oxide varistor thus obtained were evaluated. As initial electric characteristics, a threshold voltage $V_{1mA/mm}$ (a voltage for a thickness of 1 mm between terminals obtained when a current of 1mA flows) and a non-linear resistance index $0.1_{mA/1mA}$ (a value obtained by $V_{1mA}$ and $V_{0.1mA}$) were measured (the non-linear resistance index $_{0.1mA}\alpha_{1mA}$ will be hereinafter referred to as an α value).

When the non-linear resistance index is greater, the surge absorbing power is increased. The reliability for DC loading was evaluated. More specifically, DC loading of 0.2W was applied for 500 hrs. in the high-temperature atmosphere of 80° C. and the rate of change $\Delta V_{1mA}/V_{1mA}$ in varistor threshold voltage $V_{1mA}$ (the rate of change in DC loading) was measured. When the rate of change $\Delta V_{1mA}/V_{1mA}$ of the varistor threshold voltage $V_{1mA}$ is smaller, the electric characteristics of the zinc oxide varistor are more stable so that reliability can be enhanced. Furthermore, the reliability for surge was evaluated. More specifically, a pulse of 8×20 μsec and 0.5kA was applied ten times and the rate of change $\Delta V_{1mA}/V_{1mA}$ (the rate of change in surge) in the varistor threshold voltage $V_{1mA}$ was obtained. Table 1 shows the composition of samples, and Table 2 shows the results of the evaluation of electric characteristics. If the value of the rate of change in surge is smaller, the electric characteristics of the zinc oxide varistor are more stable. Tables 1 and 2 show that great reliability can be obtained with the rate of change of 5% or less.

The values indicative of the results of the evaluation of the electric characteristics are maximum and minimum values within the batches. Accordingly, if the minimum and maximum values have a smaller difference within the batches, the quality has a smaller variation within the batches.

TABLE 1

| Sample No. | ZnO (part by wt) | Synthetic powder(*) (part by wt) (Bi₂O₃:SnO₂ = 92:8) | CoO (part by wt) | MnO₂ (part by wt) | NiO (part by wt) |
|---|---|---|---|---|---|
| 001 | 100.0 | 0.1 | 0.954 | 0.414 | 0.383 |
| 002 | 100.0 | 0.2 | 0.954 | 0.414 | 0.383 |
| 003 | 100.0 | 0.5 | 0.954 | 0.414 | 0.383 |
| 004 | 100.0 | 1.0 | 0.954 | 0.414 | 0.383 |
| 005 | 100.0 | 2.5 | 0.954 | 0.414 | 0.383 |
| 006 | 100.0 | 5.0 | 0.954 | 0.414 | 0.383 |
| 007 | 100.0 | 10.0 | 0.954 | 0.414 | 0.383 |
| 008 | 100.0 | 15.0 | 0.954 | 0.414 | 0.383 |
| 009 | 100.0 | 20.0 | 0.954 | 0.414 | 0.383 |

TABLE 2

| Sample No. | $V_{1\ mA/mm}$ (V) | 0.1 mA$^\alpha$ 1 mA | Rate of change in DC loading $\Delta V_{1\ mA}/V_{1\ mA}$(%) | Rate of change in surge $\Delta V_{1\ mA}/V_{1\ mA}$(%) |
|---|---|---|---|---|
| 001 | Unmeasurable | — | — | — |
| 002 | 260 ~ 280 | 67 ~ 71 | −3 ~ +1 | −2 ~ +3 |
| 003 | 290 ~ 300 | 69 ~ 72 | −2 ~ 0 | −3 ~ 0 |
| 004 | 350 ~ 380 | 66 ~ 68 | −3 ~ −1 | −1 ~ +3 |
| 005 | 195 ~ 205 | 61 ~ 75 | −1 ~ +2 | 0 ~ +2 |
| 006 | 240 ~ 280 | 65 ~ 69 | −1 ~ +1 | −2 ~ +1 |
| 007 | 220 ~ 280 | 58 ~ 61 | −2 ~ +1 | −1 ~ 0 |
| 008 | 180 ~ 280 | 25 ~ 45 | −1 ~ +2 | −2 ~ +1 |
| 009 | Unmeasurable | — | — | — |

As is apparent from Tables 1 and 2, the zinc oxide varistor using the zinc oxide ceramics according to this example had excellent non-linear resistance characteristics and the absolute value of the rate of change of the threshold voltage $V_{1mA}$ ($\Delta V_{1mA}/V_{1mA}$) was 5% or less for long-time DC loading and surge so that great reliability could be obtained, except for sample No. 001 having 0.1 part by weight of the bismuth oxide/tin oxide synthetic powder. As shown in Table 2, the electric characteristics within the batches had a small variation.

When the zinc oxide varistor was produced from the ceramics of this example, the variation in the electric characteristics between the batches was small, similarly to the variation in the electric characteristics within the batches, which is not shown in Table 2.

In case of an example sintered at a temperature of 1200° C. which uses conventional compositions that are not heat treated and has a standard range of ±7% of $V_{1mA}$, a process capability index (one of indexes that represent a variation in products in a manufacturing factory) was 1.0. In case of sample No. 005, the process capability index was increased to 1.333. As a result, while the sample using conventional compositions which are not heat treated had a yield of 92%, the yield was considerably increased to 97% in the present example. When the amount of $Bi_2O_3/SnO_2$ synthetic powder to be added exceeded 15 parts by weight, sintered bodies were fused together (samples stuck together) because a plurality of molded bodies were superposed and sintered. Consequently, mass productivity of varistors could not be obtained and the samples stuck together. Consequently, the electric characteristics could not be measured (sample No. 008) According to the present example, consequently, it is preferable that the amount of the synthetic powder to be added should be more than 0.5 to 15 parts by weight for 100 parts by weight of a ZnO powder.

(Example 2)

A bismuth oxide ($Bi_2O_3$) powder and a tin oxide ($SnO_2$) powder (whose average particle sizes are 2 to 3 μm) were blended at a weight ratio of 92:8. The blended powder was heat treated at a temperature of 600° C. for 5 hrs. in the air, and then ground fine by means of stabilizing zirconia balls in a monomalon pot. Consequently, synthetic powder (whose average particle size is about 0.5 to 1.5 μm) was obtained. The synthetic powder which is prepared from bismuth oxide and tin oxide is called a bismuth oxide/tin oxide synthetic powder. A zinc oxide (ZnO) powder (whose average particle size is 0.3 μm), the bismuth oxide/tin oxide synthetic powder, a cobalt oxide (CoO) powder (whose average particle size is about 0.5 to 1.5 μm), a manganese dioxide ($MnO_2$) powder (whose average particle size is about 2 to 3 μm), and a nickel oxide (NiO) powder (whose average particle size is about 0.5 to 1.5 μm) were blended at a weight ratio of 100:3.0:0.954:0.414:0.383 while changing the amount of the bismuth oxide/tin oxide synthetic powder. The blended powder was mixed and ground for 18 hrs. so as to pass through a 325-mesh screen by a wet method by means of stabilizing zirconia balls in the monomalon pot. The ground powder was dried, and compressed and molded into a disk.

The temperature of the molded product thus obtained was raised at a rate of 50° C./hr in the air, held for 17 hrs. at a temperature of 750° to 1050° C. and cooled at a rate of 50° C./hr. Consequently, a sintered body was obtained. The sintered body had a thickness of 1.2 mm and a diameter of 14 mm.

A zinc oxide varistor was obtained by a method similar to Example 1.

The electric characteristics of the zinc oxide varistor thus obtained were evaluated by a method similar to Example 1. Table 3 shows the composition of samples and a sintering temperature. Table 4 shows the results of evaluation of the electric characteristics. In case of this composition, when the sintering temperature is 800° C. or less, sintering was not fully performed so that the electric characteristics could not be measured. If the sintering temperature is 1100° C. or more, the number of samples which stuck together was rapidly increased.

TABLE 3

| Sample No. | Sintering temperature (°C.) | ZnO (part by wt) | Synthetic powder(*) (part by wt) ($Bi_2O_3$:$SnO_2$ = 92:8) | CoO + $MnO_2$ +NiO Mixed powder (part by wt) (CoO:$MnO_2$:NiO = 0.954:0.414:0.383) |
|---|---|---|---|---|
| 101 | 750 | 100.0 | 3.0 | 1.751 |
| 102 | 800 | 100.0 | 3.0 | 1.751 |
| 103 | 850 | 100.0 | 3.0 | 1.751 |
| 104 | 900 | 100.0 | 3.0 | 1.751 |
| 105 | 950 | 100.0 | 3.0 | 1.751 |
| 106 | 1000 | 100.0 | 3.0 | 1.751 |
| 107 | 1050 | 100.0 | 3.0 | 1.751 |

TABLE 4

| Sample No. | $V_{1\ mA/mm}$ (V) | 0.1 mA ~ 1 mA | Rate of change in DC loading $\Delta V_{1\ mA}$/ $V_{1\ mA}$(%) | Rate of change in surge $\Delta V_{1\ mA}$/$V_{1\ mA}$(%) |
|---|---|---|---|---|
| 101 | Unmeasurable | — | — | — |
| 102 | 300 ~ 315 | 45 ~ 49 | −2 ~ 0 | −2 ~ 0 |
| 103 | 255 ~ 265 | 45 ~ 55 | −3 ~ −1 | −1 ~ +1 |
| 104 | 205 ~ 216 | 48 ~ 57 | −1 ~ +1 | −3 ~ +1 |
| 105 | 170 ~ 185 | 52 ~ 58 | −2 ~ +1 | 0 ~ +2 |
| 106 | 145 ~ 160 | 50 ~ 54 | −1 ~ 0 | 0 ~ +3 |
| 107 | 110 ~ 125 | 35 ~ 40 | −1 ~ +1 | −1 ~ +1 |

(Example 3)

A bismuth oxide powder (whose average particle size is about 2 to 3 μm) and a niobium oxide powder (whose average particle size is about 2 to 3 μm) were blended at a weight of 1:0.333. The blended powder was heat treated at a temperature of 575° C. for 5 hrs. in the air, and ground fine by a wet method for 18 hrs. by means of stabilizing zirconia balls in a monomalon pot. Consequently, a bismuth oxide/ niobium oxide ($Bi_2O_3$/$Nb_2O_5$) synthetic powder (2.33/ 0.333, whose average particle size is about 2 to 3 μm) was obtained. By the same method, a $Bi_2O_3$/$B_2O_3$ synthetic powder (2.33/0.10, whose average particle size is about 2 to 3 μm), a $Bi_2O_3$/$Cr_2O_3$ synthetic powder (2.33/0.41, whose average particle size is about 2 to 3 μm), a $Bi_2O_3$/$GeO_2$ synthetic powder (2.33/0.10, whose average particle size is about 2 to 3 μ m), a $Bi_2O_3$/$La_2O_3$ synthetic powder (2.33/ 0.41, whose average particle size is about 2 to 3 μm), a $Bi_2O_3$/MgO synthetic powder (2.33/0.41, whose average particle size is about 2 to 3 μm), a $Bi_2O_3$/$Nd_2O_3$ synthetic powder (2.33/0.50, whose average particle size is about 2 to 3 μm), a $BI_2O_3$/PbO synthetic powder (2.33/0.29, whose average particle size is about 2 to 3 μm), a $Bi_2O_3$/$Pr_6O_{11}$ synthetic powder (2.33/0.64, whose average particle size is about 2 to 3 μm), a $Bi_2O_3$/$Sb_2O_3$ synthetic powder (2.33/ 0.27, whose average particle size is about 2 to 3 μm), a $Bi_2O_3$/$SiO_2$ synthetic powder (2.33/0.077, whose average particle size is about 2 to 3 μm), a $Bi_2O_3$/$SnO_2$ synthetic powder (2.33/0.19, whose average particle size is about 2 to 3 μm), a $Bi_2O_3$/$Ta_2O_5$ synthetic powder (2.33/0.66, whose average particle size is about 2 to 3 μm), a $Bi_2O_3$/$WO_3$ synthetic powder (2.33/ 0.29, whose average particle size is about 2 to 3 μm), and a $Bi_2O_3$/$Y_2O_3$ synthetic powder (2.33/0.28, whose average particle size is about 2 to 3 μm) were obtained.

A zinc oxide powder (whose average particle size is 0.3 μm), the $Bi_2O_3$/$Nb_2O_5$ synthetic powder, a cobalt oxide powder (whose average particle size is about 0.5 to 1.5 μm), a manganese dioxide powder (whose particle size is about 2 to 3 μm), and nickel oxide (whose particle size is about 0.5 to 1.5 μm) were blended at a weight ratio of 100:2.5:0.80:0.40:0.40. The blended powder was mixed and ground fine by the wet method for 18 hrs. by means of a monomalon pot with stabilizing zirconia balls. The powder thus obtained was dried and mixed with an aluminum nitrate solution which contains 0.0013 part by weight of aluminum oxide, based on $Al_2O_3$ conversion, for 100 parts by weight of zinc oxide, and then compressed and molded into a disk. The temperature of the molded body thus obtained was raised at a rate of 150° C./hr in the air. The molded body was held at a temperature of 950° C. for 15 hrs. and then its temperature was lowered at a rate of 150° C./hr so that a sintered body was obtained. The sintered body had a thickness of 1.2 mm and a diameter of 14 min.

A zinc oxide varistor was obtained by a method similar to Example 1. The electric characteristics of the zinc oxide varistor thus obtained were evaluated by a method similar to Example 1. For other synthetic powders, experiments were made similarly to the case of the $Bi_2O_3$/$Nb_2O_5$ powder. Tables 5 and 6 show the composition of samples and Tables 7 and 8 show the results of the evaluation of the electric characteristics.

TABLE 5

| Sample No. | ZnO (part by wt) | Synthetic powder(*) (part by wt) $Bi_2O_3$/X | | CoO (part by wt) | $MnO_2$ (part by wt) | NiO (part by wt) | $Al_2O_3$ (part by wt) |
|---|---|---|---|---|---|---|---|
| 201 | 100.0 | $Bi_2O_3$ 2.19 | X = $Nb_2O_5$ 0.31 | 0.800 | 0.400 | 0.400 | 0.0013 |
| 202 | 100.0 | $B_2O_3$ 2.42 | X = MgO 0.08 | 0.800 | 0.400 | 0.400 | 0.0013 |
| 203 | 100.0 | $B_2O_3$ 2.40 | X = $GeO_2$ 0.10 | 0.800 | 0.400 | 0.400 | 0.0013 |
| 204 | 100.0 | $B_2O_3$ 2.23 | X = $Y_2O_3$ 0.28 | 0.800 | 0.400 | 0.400 | 0.0013 |
| 205 | 100.0 | $B_2O_3$ 2.40 | X = $B_2O_3$ 0.10 | 0.800 | 0.400 | 0.400 | 0.0013 |
| 206 | 100.0 | $B_2O_3$ 2.06 | X = $Nd_2O_3$ 0.44 | 0.800 | 0.400 | 0.400 | 0.0013 |
| 207 | 100.0 | $B_2O_3$ 2.22 | X = PbO 0.28 | 0.800 | 0.400 | 0.400 | 0.0013 |

TABLE 6

| Sample No. | ZnO (part by wt) | Synthetic powder(*) (part by wt) $Bi_2O_3$/X | | CoO (part by wt) | $MnO_2$ (part by wt) | NiO (part by wt) | $Al_2O_3$ (part by wt) |
|---|---|---|---|---|---|---|---|
| 208 | 100.0 | $Bi_2O_3$ 1.96 | X = $Pr_6O_{11}$ 0.54 | 0.800 | 0.400 | 0.400 | 0.0013 |
| 209 | 100.0 | $B_2O_3$ 2.24 | X = $Sb_2O_3$ 0.26 | 0.800 | 0.400 | 0.400 | 0.0013 |
| 210 | 100.0 | $B_2O_3$ 2.42 | X = $SiO_2$ 0.077 | 0.800 | 0.400 | 0.400 | 0.0013 |
| 211 | 100.0 | $B_2O_3$ 2.31 | X = $SnO_2$ 0.19 | 0.800 | 0.400 | 0.400 | 0.0013 |
| 212 | 100.0 | $B_2O_3$ 1.95 | X = $Ta_2O_5$ 0.55 | 0.800 | 0.400 | 0.400 | 0.0013 |
| 213 | 100.0 | $B_2O_3$ 2.22 | X = $WO_3$ 0.28 | 0.800 | 0.400 | 0.400 | 0.0013 |
| 214 | 100.0 | $B_2O_3$ 2.225 | X = $La_2O_3$ 0.275 | 0.800 | 0.400 | 0.400 | 0.0013 |

TABLE 7

| Sample No. | $V_{1\,mA/mm}$ (V) | 0.1 mA$^\alpha$ 1 mA | Rate of change in DC loading $\Delta V_{1\,mA}/V_{1\,mA}$(%) | Rate of change in surge $\Delta V_{1\,mA}/V_{1\,mA}$(%) |
|---|---|---|---|---|
| 201 | 160 ~ 166 | 50 ~ 55 | 0 ~ +2 | −1 ~ 0 |
| 202 | 132 ~ 138 | 40 ~ 44 | −3 ~ 0 | −2 ~ 0 |
| 203 | 265 ~ 285 | 40 ~ 50 | −1 ~ 0 | −2 ~ +2 |
| 204 | 120 ~ 135 | 35 ~ 40 | −2 ~ +2 | −3 ~ +1 |
| 205 | 425 ~ 450 | 59 ~ 64 | −1 ~ +1 | −2 ~ +1 |
| 206 | 290 ~ 300 | 45 ~ 50 | 0 ~ +2 | −2 ~ +1 |
| 207 | 350 ~ 370 | 42 ~ 50 | +1 ~ +3 | −1 ~ +2 |
| 208 | 190 ~ 215 | 30 ~ 35 | 0 ~ +2 | 0 ~ +3 |
| 209 | 200 ~ 220 | 65 ~ 70 | −1 ~ +2 | −1 ~ +1 |
| 210 | 225 ~ 240 | 55 ~ 60 | −2 ~ +2 | −2 ~ +1 |
| 211 | 190 ~ 220 | 65 ~ 71 | 0 ~ +3 | −2 ~ 0 |

TABLE 8

| Sample No. | $V_{1\,mA/mm}$ (V) | 0.1 mA$^\alpha$ 1 mA | Rate of change in DC loading $\Delta V_{1\,mA}/V_{1\,mA}$(%) | Rate of change in surge $\Delta V_{1\,mA}/V_{1\,mA}$(%) |
|---|---|---|---|---|
| 212 | 220 ~ 230 | 35 ~ 40 | −2 ~ 0 | −3 ~ −2 |
| 213 | 150 ~ 170 | 50 ~ 56 | −3 ~ −1 | −3 ~ 0 |
| 214 | 150 ~ 165 | 40 ~ 46 | −2 ~ +2 | −1 ~ +3 |

As is apparent from Tables 5 to 8, ZnO was sintered by using various kinds of synthetic powders ($Bi_2O_3$/metal oxide) so that the zinc oxide varistor produced from the zinc oxide ceramics according to this example had excellent non-linear resistance characteristics and the absolute value of the rate of change of the threshold voltage $V_{1mA}$ ($\Delta V_{1mA}/V_{1mA}$) was 5% or less for long-time DC loading and surge so that great reliability could be obtained. As shown in Tables 7 and 8, the electric characteristics within the batches had a small variation.

When the zinc oxide varistor was produced from the ceramics of this example, the variation in the electric characteristics between the batches was small, similar to the variation in the electric characteristics within the batches, which is not shown in Tables 7 and 8. While a sample using conventional compositions which are not treated by heat had a process capability index of 1.0 or less with a standard range of ±5% of $V_{1mA}$ in a method according to the prior art, the process capability index for the present invention was increased to 1.33 or more. As a result, while the sample using conventional compositions which are not treated by heat had a yield of 90% or less, the yield was considerably increased to 95% or more in the present example.

(Example 4)

Three kinds of oxides, that is, $Bi_2O_3$, $Sb_2O_3$ and X were blended and treated by heat (at a temperature of 650° C. for 1 hr), and ground to obtain six kinds of synthetic powders (whose particle size is about 2 to 3 μm) [$Bi_2O_3$/$Sb_2O_3$/X] (X=$WO_3$, $Y_2O_3$, $SiO_2$, $Nb_2O_5$, $Nd_2O_3$, $Pr_6O_{11}$). Fine particles of cobalt oxide, manganese dioxide and nickel oxide were blended at a weight ratio of 0.954:0.414:0.383 (which will be hereinafter referred to as a CoO+$MnO_2$+NiO blended powder).

A zinc oxide powder (whose average particle size is 0.3 μm), the [$Bi_2O_3$/$Sb_2O_3$/X] synthetic powder, and the CoO+$MnO_2$+NiO blended powder were weighed at a predetermined rate. The blended powder was mixed and ground fine by a wet method for 18 hrs. by means of a monomalon pot with stabilizing zirconia balls. The powder thus obtained was dried and mixed with an aluminum nitrate solution which contains 0.0013 part by weight of aluminum oxide, based on $Al_2O_3$ conversion, for 100 parts by weight of zinc oxide, and then compressed and molded into a disk. The temperature of the molded body thus obtained was raised at a rate of 100° C./hr in the air. The molded body was held at a temperature of 950° C. for 10 hrs. and then its temperature was lowered at a rate of 100° C. hr so that a sintered body was obtained. The sintered body had a thickness of 1.2 mm and a diameter of 14 mm.

A zinc oxide varistor was obtained by a method similar to Example 1. The electric characteristics of the zinc oxide varistor thus obtained were evaluated by a method similar to Example 1.

More specifically, the reliability for DC loading was evaluated. DC loading of 0.5 W was applied for 500 hrs. in the high-temperature atmosphere of 80° C. and the rate of change $\Delta V_{1mA}/V_{1mA}$ in the varistor threshold voltage $V_{1mA}$ (the rate of change in DC loading) was measured. If the rate of change $\Delta V_{1mA}/V_{1mA}$ of the varistor threshold voltage $V_{1mA}$ is smaller, the electric characteristics of the zinc oxide varistor are more stable so that greater reliability can be obtained. Further, the reliability for surge was evaluated. A pulse of 8×20 μsec and 1.0kA was applied ten times and the rate of change $\Delta V_{1mA}/V_{1mA}$ in the varistor threshold voltage $V_{1mA}$ (the rate of change in surge) was obtained. If the rate of change in surge is smaller, the electric characteristics of the zinc oxide varistor are more stable so that greater reliability can be obtained with the rate of change of 5% or less. Table 9 shows the composition of samples, and Table 10 shows the results of the evaluation of the electric characteristics.

TABLE 9

| Sample No. | ZnO (part by wt) | Synthetic powder Synthetic powder (part by wt) $Bi_2O_3$/$Sb_2O_3$/X | | | CoO + $MnO_2$ + NiO mixed powder (CoO:$MnO_2$:NiO = 0.954:0.414: 0.383) (part by wt) | $Al_2O_3$ (part by wt) |
|---|---|---|---|---|---|---|
| | | $Bi_2O_3$ | $Sb_2O_3$ | X | | |
| 301 | 100.0 | 3.58 | 0.20 | $WO_3$ 0.22 | 1.751 | 0.0013 |
| 302 | 100.0 | 3.58 | 0.20 | $Y_2O_3$ 0.22 | 1.751 | 0.0013 |
| 303 | 100.0 | 3.58 | 0.20 | $SiO_2$ 0.064 | 1.751 | 0.0013 |
| 304 | 100.0 | 3.58 | 0.20 | $Nb_2O_5$ 0.25 | 1.751 | 0.0013 |
| 305 | 100.0 | 3.58 | 0.20 | $Nd_2O_3$ 0.35 | 1.751 | 0.0013 |
| 306 | 100.0 | 3.58 | 0.20 | $Pr_6O_{11}$ 0.43 | 1.751 | 0.0013 |

TABLE 10

| Sample No. | $V_{1\,mA/mm}$ (V) | 0.1 mA$^\alpha$ 1 mA | Rate of change in DC loading $\Delta V_{1\,mA}/V_{1\,mA}$(%) | Rate of change in surge $\Delta V_{1\,mA}/V_{1\,mA}$(%) |
|---|---|---|---|---|
| 301 | 170 ~ 175 | 65 ~ 70 | −2 ~ 0 | −3 ~ −2 |
| 302 | 135 ~ 140 | 68 ~ 72 | −2 ~ 0 | −2–1 |
| 303 | 176 ~ 182 | 41 ~ 45 | −1 ~ +1 | 0 ~ +3 |

TABLE 10-continued

| Sample No. | $V_{1\ mA/mm}$ (V) | Rate of change in DC loading $\Delta V_{1\ mA}/$ 0.1 mA ∝ 1 mA $V_{1\ mA}$(%) | | Rate of change in surge $\Delta V_{1\ mA}/V_{1\ mA}$(%) |
|---|---|---|---|---|
| 304 | 168 ~ 173 | 65 ~ 72 | −2 ~ +2 | 0 ~ +2 |
| 305 | 210 ~ 215 | 60 ~ 66 | −1 ~ +2 | +2 ~ +3 |
| 306 | 220 ~ 224 | 71 ~ 76 | −2 ~ 0 | +1 ~ −3 |

As is apparent from Tables 9 and 10, the zinc oxide varistor using the ceramics of this example has a great a value and the absolute value of the rate of change $\Delta V_{1mA}/V_{1mA}$ of the threshold voltage $V_{1mA}$ was 5% or less for long-time DC loading and surge so that great reliability could be obtained.

(Example 5)

Two kinds of synthetic powders, that is, [Bi$_2$O$_3$/X] and [Bi$_2$O$_3$/Y] were selected from a synthetic powder (whose particle size is about 2 to μm) of [Bi$_2$O$_3$/metal oxide] produced in Example 3 and the like, and were mixed at a weight ratio shown in the term of the synthetic powder of Table 9 so that a synthetic powder was obtained.

Fine particles of cobalt oxide, manganese dioxide and nickel oxide were mixed at a ratio of CoO:MnO$_2$:NiO= 0.954:0.414: 0.383 (which will be hereinafter referred to as a CoO+MnO$_2$+NiO mixed powder).

A zinc oxide powder (whose average particle size is 0.3 μm), the [Bi$_2$O$_3$/X] and [Bi$_2$O$_3$/Y] synthetic powder, and the CoO+MnO$_2$+NiO mixed powder were weighed at a predetermined rate, and were mixed and ground fine by a wet method for 18 hrs. by means of a monomalon pot with stabilizing zirconia balls. The powder thus obtained was dried and mixed with an aluminum nitrate solution which contains 0.0013 part by weight of aluminum oxide, based on Al$_2$O$_3$ conversion, for 100 parts by weight of zinc oxide, and then compressed and molded into a disk. The temperature of the molded body thus obtained was raised at a rate of 100° C./hr in the air. The molded body was held at a temperature of 900° C. for 10 hrs. and then its temperature was lowered at a rate of 100° C./hr so that a sintered body was obtained. The sintered body had a thickness of 1.2 mm and a diameter of 14 mm.

A zinc oxide varistor was produced by a method similar to Example 1. The electric characteristics of the zinc oxide varistor thus obtained were evaluated by a method similar to Example 1. Tables 11 and 12 show the composition of samples, and Table 13 shows the results of the evaluation of the electric characteristics.

TABLE 11

| Sample No. | ZnO (part by wt) | Synthetic powder | | | | CoO + MnO$_2$ + NiO mixed powder (CoO:MnO$_2$ :NiO = 0.954:0.414: 0.383) (part by wt) | Al$_2$O$_3$ (part by wt) |
|---|---|---|---|---|---|---|---|
| | | Synthetic powder Bi$_2$O$_3$/SnO$_2$ (part by wt) | | Synthetic powder Bi$_2$O$_3$/Y (part by wt) | | | |
| | | Bi$_2$O$_3$ | Sn$_2$O$_3$ | Bi$_2$O$_3$ | Y | | |
| 401 | 100.0 | 1.848 | 0.152 | 1.776 | WO$_3$ 0.224 | 1.751 | 0.0013 |
| 402 | 100.0 | 1.848 | 0.152 | 1.784 | Y$_2$O$_3$ 0.216 | 1.751 | 0.0013 |
| 403 | 100.0 | 1.848 | 0.152 | 1.568 | Pr$_6$O$_{11}$ 0.432 | 1.751 | 0.0013 |
| 404 | 100.0 | 1.848 | 0.152 | 1.920 | GeO$_2$ 0.080 | 1.751 | 0.0013 |
| 405 | 100.0 | 1.848 | 0.152 | 1.776 | WO$_3$ 0.224 | 1.751 | 0.0013 |
| 406 | 100.0 | 1.848 | 0.152 | 1.94 | MgO 0.064 | 4.751 | 0.0013 |

TABLE 12

| Sample No. | ZnO (part by wt) | Synthetic powder | | | | CoO + MnO$_2$ + NiO mixed powder (CoO:MnO$_2$ :NiO = 0.954:0.414: 0.383) (part by wt) | Al$_2$O$_3$ (part by wt) |
|---|---|---|---|---|---|---|---|
| | | Synthetic powder Bi$_2$O$_3$/Nb$_2$O$_5$ (part by wt) | | Synthetic powder Bi$_2$O$_3$/Y (part by wt) | | | |
| | | Bi$_2$O$_3$ | Nb$_2$O$_5$ | Bi$_2$O$_3$ | Y | | |
| 407 | 100.0 | 1.752 | 0.248 | 1.784 | Y$_2$O$_3$ 0.216 | 1.751 | 0.0013 |
| 408 | 100.0 | 1.752 | 0.248 | 1.936 | MgO 0.064 | 1.751 | 0.0013 |
| 409 | 100.0 | 1.752 | 0.248 | 1.568 | Pr$_6$O$_{11}$ 0.432 | 1.751 | 0.0013 |

TABLE 12-continued

| | | Synthetic powder | | | CoO + MnO$_2$ + NiO mixed | |
|---|---|---|---|---|---|---|
| | | Synthetic powder Bi$_2$O$_3$/Nb$_2$O$_5$ (part by wt) | | Synthetic powder Bi$_2$O$_3$/Y (part by wt) | | powder (CoO:MnO$_2$ :NiO = 0.954:0.414: 0.383) | Al$_2$O$_3$ (part |
| Sample No. | ZnO (part by wt) | Bi$_2$O$_3$ | Nb$_2$O$_5$ | Bi$_2$O$_3$ | Y | (part by wt) | by wt) |
| 410 | 100.0 | 1.752 | 0.248 | 1.780 | La$_2$O$_3$ 0.220 | 1.751 | 0.0013 |
| 411 | 100.0 | 1.752 | 0.248 | 1.776 | WO$_3$ 0.224 | 1.751 | 0.0013 |
| 412 | 100.0 | 1.752 | 0.248 | 1.920 | GeO$_2$ 0.080 | 1.751 | 0.0013 |

TABLE 13

| Sample No. | $V_{1\,mA/mm}$ (V) | 0.1 mA$^\alpha$ 1 mA | Rate of change in DC loading $\Delta V_{1\,mA}/V_{1\,mA}(\%)$ | Rate of change in surge $\Delta V_{1\,mA}/V_{1\,mA}(\%)$ |
|---|---|---|---|---|
| 401 | 240 ~ 244 | 48 ~ 54 | -3 ~ 0 | 0 ~ +3 |
| 402 | 201 ~ 206 | 49 ~ 54 | -3 ~ -1 | 0 ~ +2 |
| 403 | 221 ~ 225 | 51 ~ 55 | -2 ~ 0 | -1 ~ +2 |
| 404 | 197 ~ 205 | 47 ~ 50 | -2 ~ +1 | -1 ~ +1 |
| 405 | 246 ~ 250 | 51 ~ 55 | -2 ~ +1 | 0 ~ +3 |
| 406 | 270 ~ 280 | 65 ~ 75 | -3 ~ 0 | 0 ~ +2 |
| 407 | 155 ~ 162 | 44 ~ 47 | -3 ~ -1 | 0 ~ +3 |
| 408 | 121 ~ 128 | 51 ~ 55 | -3 ~ -1 | -3 ~ -1 |
| 409 | 192 ~ 197 | 41 ~ 44 | -1 ~ +1 | 0 ~ +2 |
| 410 | 206 ~ 215 | 46 ~ 49 | +1 ~ +2 | 0 ~ +2 |
| 411 | 240 ~ 246 | 41 ~ 45 | 0 ~ +2 | -1 ~ +2 |
| 412 | 122 ~ 128 | 35 ~ 42 | -1 ~ +2 | -2 ~ +2 |

As is apparent from Tables 11 and 12 and Table 13, in the case where two kinds of synthetic powders [Bi$_2$O$_3$/X] and [Bi$_2$O$_3$/Y] are added, the zinc oxide varistor using the ceramics of this example had a great α value and the absolute value of the rate of change $\Delta V_{1mA}/V_{1mA}$ of the threshold voltage $V_{1mA}$ was 5% or less for long-time DC loading and surge so that great reliability could be obtained. (Example 6)

Figure 2:
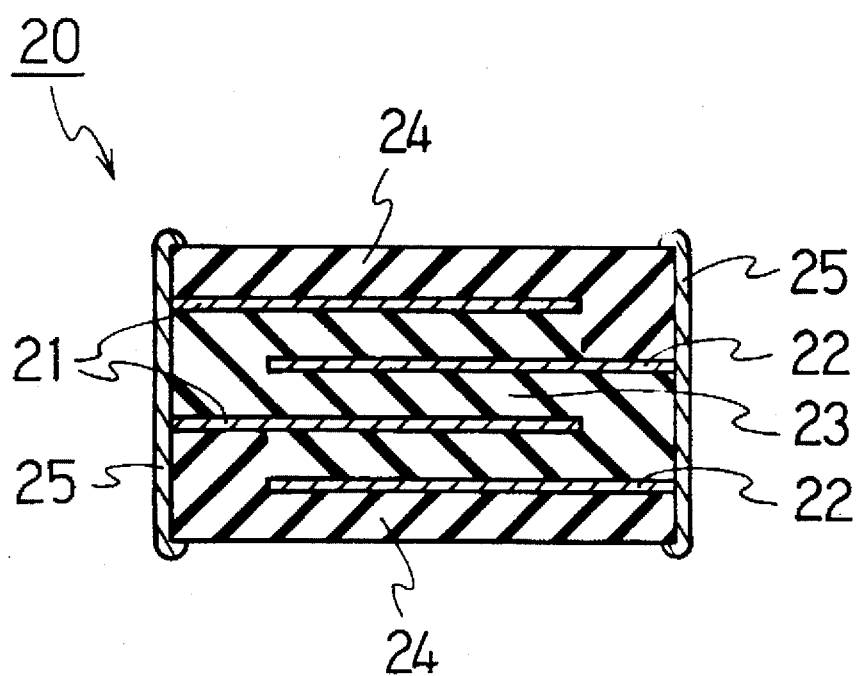
FIG. 2 is a sectional view showing a zinc oxide varistor of a lamination type produced by using zinc oxide ceramics according to Example 6 of the present invention.

Mixed fine particles of (Bi$_2$O$_3$+Sb$_2$O$_3$), (Bi$_2$O$_3$+SnO$_2$) and (Bi$_2$O$_3$+CR$_2$O$_3$) were preliminarily heat treated at a temperature of 475° C. for 5 hrs. and then ground so that synthetic powders (Bi$_2$O$_3$/Sb$_2$O$_3$), (Bi$_2$O$_3$/SnO$_2$) and (Bi$_2$O$_3$/Cr$_2$O$_3$) were produced. Thereafter, these synthetic powders were added to a zinc oxide powder (whose average particle size is 0.3 μm) together with CoO+MnO$_2$+NiO mixed fine particles (fine particles of cobalt oxide, manganese dioxide and nickel oxide are mixed at a ratio of CoO:MnO$_2$:NiO=0.954:0.414:0.383). The mixed powder thus obtained was ground. Subsequently, 50% by weight of the mixed fine particles were extracted. A butyl resin (5% by weight) and a plasticizer (2.5% by weight of phtalic acid D-n butyl) were mixed with 2-butanol (7.5%by weight) and a butyl acetate solvent (35% by weight). They were mixed with the fine particles. Thus, a sheet was formed. Then, the sheet was cut. A paste whose main component is silver was applied to a part of the sheet surface by printing. Four sheets having the silver paste printed thereon were laminated. Sheets having no silver paste printed were laminated on the uppermost and lowermost portions of a laminated product and a silver paste for external electrodes was applied to both sides of the laminated product. Thereafter, the mixed fine particles and the silver electrode were sintered integrally at a temperature of 840° C. Thus, a zinc chloride laminated chip varistor was produced. FIG. 2 is a sectional view showing the varistor of a lamination type thus obtained. In FIG. 2, the reference numeral 20 designates a zinc oxide varistor of a lamination type, the reference numeral 21 designates an internal electrode made of silver, the reference numeral 22 designates an internal counter electrode made of silver, the reference numeral 23 designates an effective layer, the reference numeral 24 designates a noneffective layer, and the reference numeral 25 designates an external electrode made of silver. The effective layer of a chip has a thickness of 40 μm, the noneffective layer of the chip has a thickness of 200 μm, and an electrode has a thickness of 5 to 6 μm. The laminated chip varistor has the shape of a rectangular parallelepiped having a length of 3.2 mm, a width of 1.6 mm and a thickness of 0.55 mm.

After the initial characteristics of the zinc oxide laminated chip varistor were measured, electric loads were applied to obtain reliability characteristics. Loading was performed on the conditions of 0.02 W×500 hrs. and two-time pulse application of 300 Amp. (8×20 μsec.). Table 14 shows the composition of samples, and Table 15 shows initial characteristics and loading characteristics.

TABLE 14

| | | Synthetic powder | | | | | | CoO + MnO$_2$ + |
|---|---|---|---|---|---|---|---|---|
| | ZnO (part by wt) | Synthetic powder Bi$_2$O$_3$/Sb$_2$O$_3$ (part by wt) | | Synthetic powder Bi$_2$O$_3$/SnO$_2$ (part by wt) | | Synthetic powder Bi$_2$O$_3$/Cr$_2$O$_3$ (part by wt) | | NiO mixed powder CoO:MnO$_2$:NiO = 0.954: 0.414:0.383 |
| Sample No. | | Bi$_2$O$_3$ | Sb$_2$O$_3$ | Bi$_2$O$_3$ | SnO$_2$ | Bi$_2$O$_3$ | Cr$_2$O$_3$ | (part by wt) |
| 501 | 100.0 | 0.876 | 0.276 | 1.848 | 0.125 | 1.18 | 0.06 | 1.751 |

TABLE 15

| Sample No. | $V_{1\,mA/mm}$ (V) | | Rate of change in DC loading $\Delta V_{1\,mA}/$ $V_{1\,mA}$(%) | Rate of change in surge $\Delta V_{1\,mA}/V_{1\,mA}$(%) |
|---|---|---|---|---|
| | | 0.1 mA$^\alpha$  1 mA | | |
| 501 | 32 ~ 37 | 32 ~ 35 | −3 ~ +2 | −4 ~ 0 |

As is apparent from Tables 14 and 15, the zinc oxide varistor using the ceramics of this example could be sintered at a very low temperature. Although the varistor was small-sized, excellent characteristics could be obtained.

(Example 7)

The mixed powder of zinc oxide and magnesium oxide (ZnO:MgO=92:8 wt ratio) was produced. Then, the mixed powders of (Bi$_2$O$_3$+Sb$_2$O$_3$), (Bi$_2$O$_3$+CR$_2$O$_3$), (Bi$_2$O$_3$+B$_2$O$_3$) and (Bi$_2$O$_3$+SnO$_2$) were preliminarily heat treated at a temperature of 500° C. for 2 hrs. so that four kinds of synthetic powders were obtained.

(1) Bi$_2$O$_3$/Sb$_2$O$_3$ (Bi$_2$O$_3$:Sb$_2$O$_3$=1.30:0.20 wt ratio),
(2) Bi$_2$O$_3$/Cr$_2$O$_3$ (Bi$_2$O$_3$:CR$_2$O$_3$=0.18:0.006 wt ratio),
(3) Bi$_2$O$_3$/B$_2$O$_3$ (Bi$_2$O$_3$:B$_2$O$_3$=0.23:0.002 wt ratio), and
(4) Bi$_2$O$_3$/SnO$_2$ (Bi$_2$O$_3$:SnO$_2$=0.18:0.006 wt ratio).

Then, the synthetic powders were mixed at a weight ratio of (Bi$_2$O$_3$/Sb$_2$O$_3$):(Bi$_2$O$_3$/Cr$_2$O$_3$):(Bi$_2$O$_3$/B$_2$O$_3$):(Bi$_2$O$_3$/SnO$_2$)=1.5:0.24:0.25:1.0. Consequently, a synthetic powder (Bi$_2$O$_3$/Sb$_2$O$_3$+Bi$_2$O$_3$/Cr$_2$O$_3$+Bi$_2$O$_3$/B$_2$O$_3$+Bi$_2$O$_3$/SnO$_2$) was obtained.

2.99 parts by weight of the synthetic powder (Bi$_2$O$_3$/Sb$_2$O$_3$+Bi$_2$O$_3$/Cr$_2$O$_3$+Bi$_2$O$_3$/B$_2$O$_{+Bi2}$O$_3$/SnO$_2$) and 1.751 parts by weight of a mixed powder (CoO+MnO$_2$+NiO) were added and 0.0013 part by weight of aluminum oxide was added in an aluminum nitrate solution for 100 parts by weight of the mixed powder (ZnO+MgO), blended, ground, dried, compressed, molded and sintered at a temperature of 850° C. for 10 hrs. Thus, a zinc oxide varistor was produced.

By a similar method, the following synthetic powders were produced, and a ZnO varistor was produced to measure electric characteristics.

Synthetic powder of (Bi$_2$O$_3$/Sb$_2$O$_3$+Bi$_2$O$_3$/Cr$_2$O$_3$+Bi$_2$O$_3$/B$_2$O$_3$+Bi$_2$O$_3$/SiO$_2$), synthetic powder of (Bi$_2$O$_3$/Sb$_2$O$_3$+Bi$_2$O$_3$/Cr$_2$O$_3$+Bi$_2$O$_3$/B$_2$O$_3$+Bi$_2$O$_3$/Nb$_2$O$_5$), and synthetic powder of (Bi$_2$O$_3$/Sb$_2$O$_3$+Bi$_2$O$_3$/Cr$_2$O$_3$+Bi$_2$O$_3$/B$_2$O$_3$+Bi$_2$O$_3$/PbO).

More specifically, the reliability for DC loading was evaluated. DC loading of 0.5 W was applied for 500 hrs. in the high-temperature atmosphere of 80° C and the rate of change $\Delta V_{1mA}/V_{1mA}$ in the varistor threshold voltage $V_{1mA}$ (the rate of change in DC loading) was measured. When the rate of change $\Delta V_{1mA}/V_{1mA}$ in the varistor threshold voltage $V_{1mA}$ is smaller, the electric characteristics of the zinc oxide varistor are more stable so that reliability can be enhanced. Furthermore, the reliability for surge was evaluated. More specifically, a pulse of 8×20 μ sec and 1.0 kA was applied ten times and the rate of change $\Delta_{1mA}/V_{1mA}$ (the rate of surge) in the varistor threshold voltage $V_{1mA}$ was obtained. Table 16 shows the composition of samples, and Table 17 shows the results of the evaluation of electric characteristics. If the value of the rate of change in surge is smaller, the electric characteristics of the zinc oxide varistor is more stable. Tables 16 and 17 show that the reliability can be obtained with the rate of change of 5% or less.

TABLE 16

| | | Synthetic powder | | | | | | | | |
|---|---|---|---|---|---|---|---|---|---|---|
| | ZnO + MgO (*) (part by wt) | Synthetic powder Bi$_2$O$_3$/Sb$_2$O$_3$ (part by wt) | | Synthetic powder Bi$_2$O$_3$/Cr$_2$O$_3$ (part by wt) | | Synthetic powder Bi$_2$O$_3$/B2O3 (part by wt) | | Synthetic powder Bi$_2$O$_3$/X (part by wt) | | Others (part by wt) |
| Sample No. | | Bi$_2$O$_3$ | Sb$_2$O$_3$ | Bi$_2$O$_3$ | Cr$_2$O$_3$ | Bi$_2$O$_3$ | B$_2$O$_3$ | Bi$_2$O$_3$ | X | |
| 601 | 100 | 1.30 | 0.20 | 0.18 | 0.06 | 0.23 | 0.02 | 0.93 | SnO$_2$ 0.07 | ** *** |
| 602 | 100 | 1.30 | 0.20 | 0.18 | 0.06 | 0.23 | 0.02 | 0.88 | Nb$_2$O$_5$ 0.12 | ** *** |
| 603 | 100 | 1.30 | 0.20 | 0.18 | 0.06 | 0.23 | 0.02 | 0.97 | SiO$_2$ 0.03 | ** *** |

TABLE 16-continued

| | | Synthetic powder | | | | | | | |
|---|---|---|---|---|---|---|---|---|---|
| Sample No. | ZnO + MgO (*) (part by wt) | Synthetic powder $Bi_2O_3/Sb_2O_3$ (part by wt) | | Synthetic powder $Bi_2O_3/Cr_2O_3$ (part by wt) | | Synthetic powder $Bi_2O_3/B2O3$ (part by wt) | | Synthetic powder $Bi_2O_3/X$ (part by wt) | | Others (part by wt) |
| | | $Bi_2O_3$ | $Sb_2O_3$ | $Bi_2O_3$ | $Cr_2O_3$ | $Bi_2O_3$ | $B_2O_3$ | $Bi_2O_3$ | X | |
| 604 | 100 | 1.30 | 0.20 | 0.18 | 0.06 | 0.23 | 0.02 | 0.95 | PbO 0.05 | ** *** |

*Mixed powder of ZnO + MgO, ZnO:MgO = 92:8 wt ratio
**$Al_2O_3$:0.0013 (part by wt)
***Mixed powder of $CoO:MnO_2:NiO$(= 0.954:0.414:0.383 wt ratio):1.751 (part by wt)

TABLE 17

| Sample No. | $V_{1\,mA/mm}$ (V) | 0.1 mA$^\alpha$ 1 mA | Rate of change in DC loading $\Delta V_{1\,mA}/V_{1\,mA}(\%)$ | Rate of change in surge $\Delta V_{1\,mA}/V_{1\,mA}(\%)$ |
|---|---|---|---|---|
| 601 | 145 ~ 152 | 59 ~ 64 | −2 ~ 0 | 0 ~ +3 |
| 602 | 275 ~ 285 | 53 ~ 58 | −1 ~ +1 | −2 ~ 0 |
| 603 | 280 ~ 292 | 46 ~ 53 | 0 ~ +2 | 0 ~ +2 |
| 604 | 185 ~ 194 | 50 ~ 55 | 0 ~ +3 | +1 ~ +3 |

(Example 8)

A bismuth oxide ($Bi_2O_3$) powder and an antimony oxide ($Sb_2O_3$) powder (whose average particle sizes are about 2 to 3 μm) were blended at a weight ratio of 98:2. The blended powder was heated at a temperature of 600° C. for 5 hrs. in the air, and then ground fine by means of stabilizing zirconia balls in a monomalon pot. Consequently, a synthetic powder (whose average particle size is about 0.5 to 1.5 μm) was obtained. The synthetic powder which is prepared from bismuth oxide and antimony oxide is called a bismuth oxide/antimony oxide synthetic powder.

A zinc oxide (ZnO) powder (whose average particle size is 0.3 μm), a bismuth oxide/antimony oxide synthetic powder, a cobalt oxide (CoO) powder (whose average particle size is about 0.5 to 1.5 μm), and a manganese dioxide ($MnO_2$) powder (whose average particle size is about 2 to 3 μm) were blended at a weight ratio of 100:0.2 to 25.0:0.954:0.414 while changing the amount of the bismuth oxide/antimony oxide synthetic powder. The blended powder was mixed and ground for 12 to 18 hrs. by the wet method by means of stabilizing zirconia balls in the monomalon pot so as to pass through a 325-mesh screen. The ground powder was dried, and compressed and molded into a disk. The temperature of a molded product thus obtained is raised at a rate of 50° C./hr in the air, held for 13 hrs. at a temperature of 975° C. and cooled at a rate of 50° C./hr. Consequently, a sintered body was obtained. The sintered body had a thickness of 1.2 mm and a diameter of 14 mm.

A zinc oxide varistor was formed as shown in FIG. 1.

The electric characteristics of the zinc oxide varistor thus obtained were evaluated. As initial electric characteristics, a threshold voltage $V_{1mA}/mm$ (a voltage for 1 mm thickness between terminals obtained when a current of 1 mA flows) and a non-linear resistance index $_{0.1mA}/_{mA}$ (a value obtained by $V_{1mA}$ and $V_{0.1mA}$) were measured (the non-linear resistance index $_{0.1mA}\alpha_{1mA}$ is briefly expressed as $_{0.1}\alpha_{1mA}$ in all tables, and will be hereinafter referred to as an α value). When the non-linear resistance index is greater, surge absorbing power is increased. The reliability for DC loading was evaluated. More specifically, DC loading of 0.2W was applied for 500 hrs. in the high-temperature atmosphere of 80° C and the rate of change $\Delta V_{1mA}/V_{1mA}$ in a varistor threshold voltage $V_{1mA}$ (the rate of change in DC loading) was measured. When the rate of change $\Delta V_{1mA}/V_{1mA}$ of the varistor threshold voltage $V_{1mA}$ is smaller, the electric characteristics of the zinc oxide varistor are more stable so that reliability can be enhanced. Furthermore, the reliability for surge was evaluated. More specifically, a pulse of 8×20 μsec and 0.5kA was applied twice and the rate of change $\Delta V_{1mA}/V_{1mA}$ (the rate of change in surge) in the varistor threshold voltage $V_{1mA}$ was obtained. Table 18 shows the composition of samples, and Table 19 shows the results of the evaluation of electric characteristics. If the value of the rate of change in surge is smaller, the electric characteristics of the zinc oxide varistor are more stable so that great reliability can be obtained. The values indicative of the results of the evaluation of the electric characteristics are maximum and minimum values within the batches. Accordingly, if the minimum and maximum values have a smaller difference within the batches, the quality has a smaller variation within the batches.

TABLE 18

| Sample No. | ZnO (part by wt) | $Bi_2O_3$—$Sb_2O_3$ Synthetic powder (*) (part by wt) | CoO (part by wt) | $MnO_2$ (part by wt) |
|---|---|---|---|---|
| 701 | 100.0 | 0.2 | 0.954 | 0.414 |
| 702 | 100.0 | 0.5 | 0.954 | 0.414 |
| 703 | 100.0 | 0.7 | 0.954 | 0.414 |
| 704 | 100.0 | 1.0 | 0.954 | 0.414 |
| 705 | 100.0 | 2.0 | 0.954 | 0.414 |
| 706 | 100.0 | 5.0 | 0.954 | 0.414 |
| 707 | 100.0 | 10.0 | 0.954 | 0.414 |
| 708 | 100.0 | 20.0 | 0.954 | 0.414 |
| 709 | 100.0 | 25.0 | 0.954 | 0.414 |

(*) Heat treatment of $Bi_2O_3:Sb_2O_3$ = 8:2 (wt ratio)

TABLE 19

| Sample No. | $V_{1\,mA/mm}$ (V) | $0.1^\alpha$ 1 mA | Rate of change in DC loading $\Delta V_{1\,mA}/V_{1\,mA}$(%) | Rate of change in surge $\Delta V_{1\,mA}/V_{1\,mA}$(%) |
|---|---|---|---|---|
| 701 | 150 ~ 250 | 25 ~ 40 | −20 ~ −10 | −40 ~ −25 |
| 702 | 215 ~ 235 | 45 ~ 55 | −4 ~ −1 | −4 ~ −1 |
| 703 | 210 ~ 230 | 45 ~ 60 | −4 ~ −2 | −3 ~ 0 |
| 704 | 200 ~ 225 | 50 ~ 60 | −3 ~ −1 | −3 ~ 0 |
| 705 | 200 ~ 220 | 50 ~ 65 | 0 ~ +1 | −2 ~ +1 |
| 706 | 195 ~ 220 | 50 ~ 65 | −1 ~ +1 | −1 ~ +1 |
| 707 | 195 ~ 215 | 55 ~ 65 | −1 ~ +1 | 0 ~ +2 |
| 708 | 190 ~ 215 | 50 ~ 70 | 0 ~ +2 | 0 ~ +2 |
| 709 | — | — | — | — |

As is apparent from Tables 18 and 19, the zinc oxide varistor using the zinc oxide ceramics according to this example had a high threshold voltage $V_{1mA/mm}$ and the absolute value of the rate of change $\Delta V_{1mA}/V_{1mA}$ in the threshold voltage $V_{1mA}$ was 5% or less for long-time DC loading and surge so that great reliability could be obtained, except for sample No. 701 having 0.2 part by weight of the bismuth oxide/antimony oxide synthetic powder. As shown in Table 19, the electric characteristics within the batches had a small variation.

When the zinc oxide varistor was produced from the ceramics of this example, the variation in the electric characteristics between the batches was small, similarly to the variation in the electric characteristics within the batches, which is not shown in Table 19. In case of an example sintered at a temperature of 1200° C. which uses conventional compositions that are not heat treated and has a standard range of ±7% of $V_{1mA}$, a process capability index (one of indexes that represent a variation in products in a manufacturing factory) was 1.0. The process capability index for the present invention was increased to 1.333. As a result, while the sample using conventional compositions which are not heat treated had a yield of 90%, the yield was considerably increased to 95% in the present example. When the amount of $Bi_2O_3/Sb_2O_3$ synthetic powder to be added exceeded 20 parts by weight, sintered bodies were fused together (samples stuck together) because a plurality of molded bodies were superposed and sintered. Consequently, mass productivity could not be obtained and the samples stuck together. Consequently, the electric characteristics could not be measured (sample No. 709) Accordingly, it is preferable that the amount of the synthetic powder to be added should be 0.5 to 20 parts by weight for 100 parts by weight of a ZnO powder.

(Comparative Example 1)

Three kinds of zinc oxide varistors using a sintered body which has the same compositions as in Example 8 were produced from ceramics according to the prior art in which the mixed product of a bismuth oxide powder and an antimony oxide powder was heat treated in advance and was not synthesized.

A zinc oxide powder, a bismuth oxide powder, an antimony oxide powder, a cobalt oxide powder and a manganese oxide powder were blended at a weight ratio of 100:0.98:0.02:0.954: 0.414 (Sample No. 714), 100:1.96:0.04:0.954:0.414 (Sample No. 715), and 100:4.9:0.1:0.954:0.414 (Sample No. 716). These powders were mixed and ground for 18 hrs. by a wet method by means of stabilizing zirconia balls in the monomalon pot. In the same manner as in Example 8, a sintered body having a thickness of 1.2 mm and a diameter of 14 mm was obtained to produce a zinc oxide varistor. The electric characteristics of the zinc oxide varistor were evaluated. Table 20 shows the composition of samples and Table 21 shows the results of evaluation of the electric characteristics.

TABLE 20

| Sample No. | ZnO (part by wt) | $B_2O_3$ (part by wt) | $Sb_2O_3$ (part by wt) | CoO (part by wt) | $MnO_2$ (part by wt) |
|---|---|---|---|---|---|
| 714 | 100.0 | 0.98 | 0.02 | 0.954 | 0.414 |
| 715 | 100.0 | 1.96 | 0.04 | 0.954 | 0.414 |
| 716 | 100.0 | 4.9 | 0.1 | 0.954 | 0.414 |

TABLE 21

| Sample No. | $V_{1\,mA/mm}$ (V) | $0.1^\alpha$ 1 mA | Rate of change in DC loading $\Delta V_{1\,mA}/V_{1\,mA}$(%) | Rate of change in surge $\Delta V_{1\,mA}/V_{1\,mA}$(%) |
|---|---|---|---|---|
| 714 | 150 ~ 250 | 15 ~ 30 | −40 ~ −25 | −35 ~ −25 |
| 715 | 125 ~ 170 | 15 ~ 40 | −35 ~ −20 | −32 ~ −15 |
| 716 | 130 ~ 210 | 25 ~ 40 | −40 ~ −35 | −32 ~ −20 |

As is apparent from Tables 20 and 21, the zinc oxide varistor produced from the ceramics according to this example had $V_{1mA}$ lowered remarkably after DC loading of 0.2 W, and the absolute value of the rate of change in DC loading $\Delta V_{1mA}/V_{1mA}$ of 10% or more. In addition, the absolute value of the rate of change in surge exceeded 10% so that reliability was considerably poor. As shown in Table 21, a variation within the batches was great.

A variation in electric characteristics between batches of the zinc oxide varistor according to the comparative example was greater than the variation within the batches, which is not shown in Table 21. Many varistors had $V_{1mA/mm}$ and an a value (non-linear resistance index) which are lower than the values shown in Table 21. More specifically, it is apparent that a sintering temperature of 975° C. is too low in the method according to the prior art so that it is unsuitable for the manufacture of the zinc oxide varistor.

As is apparent from Example 8 and a comparative example 1, the zinc oxide varistor using a low-temperature sintered body according to this example was more excellent in initial electric characteristics, reliability and variations within batches and between batches than the zinc oxide varistor according to the prior art.

(Example 9)

Bismuth oxide powder (whose average particle size is about 2 to 3 μm) and antimony oxide powder (whose average particle size is about 2 to 3 μm) were mixed at a weight ratio of 60:40 and heat treated at a temperature of 675° C. for 15 mins. in the air, and ground fine by a wet method for 18 hrs. by means of stabilizing zirconia balls in a monomalon pot. Consequently, a synthetic powder of $Bi_2O_3/Sb_2O_3$ (whose average particle size is about 2 to 3 μm) was obtained.

A zinc oxide powder (whose average particle size is 0.3 μm), the $Bi_2O_3/Sb_2O_3$ synthetic powder, a cobalt oxide powder (whose average particle size is about 0.5 to 1.5 μm), and a manganese dioxide powder (whose particle size is about 2 to 3 μm) were blended at a weight ratio of 100:3.5:0.80:0.40. The blended powder was mixed and ground fine by the wet method for 18 hrs. by means of a monomalon pot with stabilizing zirconia balls. The powder thus obtained was dried and mixed with an aluminum nitrate solution which contains 0.0013 part by weight of aluminum oxide, based on $Al_2O_3$ conversion, for 100 parts by weight of zinc oxide, and then compressed and molded into a disk. The temperature of the molded body thus obtained was raised at a rate of 150° C./hr in the air. The molded body was held at a temperature of 800° C., 850° C., 900° C., 950° C., 1000° C., 1050° C. and 1100° C. for 15 hrs. and then its temperature was lowered at a rate of 150° C./hr so that a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 22 shows the composition of samples and Table 23 shows the results of evaluation of the electric characteristics.

TABLE 22

| Sample No. | Sintering temperature (°C.) | ZnO (part by wt) | $Bi_2O_3$—$Sb_2O_3$ Synthetic fine particles (*) (part by wt) | CoO (part by wt) | $MnO_2$ (part by wt) | $Al_2O_3$ (part by wt) |
|---|---|---|---|---|---|---|
| 801 | 800 | 100.0 | 3.5 | 0.80 | 0.400 | 0.0013 |
| 802 | 850 | 100.0 | 3.5 | 0.80 | 0.400 | 0.0013 |
| 803 | 900 | 100.0 | 3.5 | 0.80 | 0.400 | 0.0013 |
| 804 | 950 | 100.0 | 3.5 | 0.80 | 0.400 | 0.0013 |
| 805 | 1000 | 100.0 | 3.5 | 0.80 | 0.400 | 0.0013 |
| 806 | 1050 | 100.0 | 3.5 | 0.80 | 0.400 | 0.0013 |
| 807 | 1100 | 100.0 | 3.5 | 0.80 | 0.400 | 0.0013 |

(*)Heat treatment of a mixture $Bi_2O_3$:$Sb_2O_3$ = 60:40 (weight ratio)

TABLE 23

| Sample No. | $V_{1\,mA/mm}$ (V) | $0.1^\alpha$ 1 mA | Rate of change in DC loading $\Delta V_{1\,mA}/V_{1\,mA}(\%)$ | Rate of change in surge $\Delta V_{1\,mA}/V_{1\,mA}(\%)$ |
|---|---|---|---|---|
| 801 | 310 ~ 350 | 30 ~ 45 | −4 ~ −2 | −3 ~ +1 |
| 802 | 270 ~ 300 | 45 ~ 55 | −4 ~ 0 | −4 ~ +1 |
| 803 | 250 ~ 290 | 45 ~ 55 | −3 ~ −1 | −3 ~ 0 |
| 804 | 240 ~ 280 | 50 ~ 65 | −2 ~ +1 | −2 ~ +1 |
| 805 | 220 ~ 270 | 50 ~ 60 | −1 ~ +1 | +1 ~ +3 |
| 806 | 220 ~ 250 | 55 ~ 65 | 0 ~ +2 | 0 ~ +3 |
| 807 | 220 ~ 255 | 55 ~ 65 | 0 ~ +3 | −1 ~ +2 |

As is apparent from Tables 22 to 23, the zinc oxide varistor produced from the ceramics of this example as a result of sintering at a temperature of 800° to 1100° C. has a high threshold voltage, and the absolute value of the rate of change $\Delta V_{1mA}/V_{1mA}$ in the threshold voltage $V_{1mA}$ was 5% or less for long-time DC loading and surge so that great reliability could be obtained. As shown in Table 23, the electric characteristics within the batches had a small variation.

When the zinc oxide varistor was produced from the ceramics of this example, the variation in the electric characteristics between the batches was small, similarly to the variation in the electric characteristics within the batches, which is not shown in Table 23. While a sample using conventional compositions which are not heat treated had a process capability index of 1.0 or less with a standard range of ±5% of $V_{1mA}$ in a method according to the prior art, the process capability index was increased to 1.33. As a result, while the sample using conventional compositions which are not heat treated had a yield of 90%, the yield was considerably increased to 95% in the present example.

(Example 10)

A zinc oxide powder (whose average particle size is about 2 to 3 μm) and an antimony oxide fine powder (whose average particle size is about 2 to 3 μm) were blended at a weight ratio shown in the term of the synthetic powder in Table 24. The blended powder was heat treated at a temperature of 475° C. for 5 hrs. in the air to obtain ten kinds of synthetic powders of bismuth oxide and antimony oxide (whose average particle size is about 2 to 3 μm).

A zinc oxide powder (whose average particle size is 0.3 μm), the synthetic powder of bismuth oxide and antimony oxide, a cobalt oxide powder (whose average particle size is about 0.5 to 1.5 μm), and a manganese dioxide powder (whose average particle size is about 2 to 3 μm) were blended at a weight ratio shown in Table 24, and mixed and ground by the wet method for 18 hrs. by means of a monomalon pot with stabilizing zirconia balls. The powder thus obtained was dried and mixed with an aluminum nitrate solution which contains 0.0013 part by weight of aluminum oxide, based on $Al_2O_3$ conversion, for 100 parts by weight of zinc oxide, and then compressed and molded into a disk. The temperature of the molded body thus obtained was raised at a rate of 100° C./hr in the air. The molded body was held at a temperature of 1050° C. for 20 hrs. and then its temperature was lowered at a rate of 100° C./hr so that a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 24 shows the composition of samples, and Table 25 shows the results of evaluation of the electric characteristics.

TABLE 24

| Sample No. | ZnO (part by wt) | $Bi_2O_3$ + $Sb_2O_3$ Synthetic powder (part by wt) | | CoO (part by wt) | $MnO_2$ (part by wt) | $Al_2O_3$ (part by wt) |
|---|---|---|---|---|---|---|
| | | $Bi_2O_3$ | $Sb_2O_3$ | | | |
| 901 | 100.0 | 0.2 | 0.02 | 0.50 | 0.50 | 0.0013 |
| 902 | 100.0 | 0.5 | 0.02 | 0.50 | 0.50 | 0.0013 |
| 903 | 100.0 | 10.0 | 0.02 | 0.50 | 0.50 | 0.0013 |
| 904 | 100.0 | 20.0 | 0.02 | 0.50 | 0.50 | 0.0013 |
| 905 | 100.0 | 3.0 | 0.005 | 0.50 | 0.50 | 0.0013 |
| 906 | 100.0 | 3.0 | 0.01 | 0.50 | 0.50 | 0.0013 |
| 907 | 100.0 | 3.0 | 0.1 | 0.50 | 0.50 | 0.0013 |
| 908 | 100.0 | 3.0 | 1.0 | 0.50 | 0.50 | 0.0013 |
| 909 | 100.0 | 10.0 | 10.0 | 0.50 | 0.50 | 0.0013 |
| 910 | 100.0 | 10.0 | 15.0 | 0.50 | 0.50 | 0.0013 |

TABLE 25

| Sample No. | $V_{1\,mA/mm}$ (V) | $0.1^\alpha$ 1 mA | Rate of change in DC loading $\Delta V_{1\,mA}/V_{1\,mA}(\%)$ | Rate of change in surge $\Delta V_{1\,mA}/V_{1\,mA}(\%)$ |
|---|---|---|---|---|
| 901 | 120 ~ 190 | 20 ~ 35 | −15 ~ −10 | −55 ~ −40 |
| 902 | 195 ~ 210 | 45 ~ 55 | −4 ~ −1 | −4 ~ −1 |
| 903 | 220 ~ 230 | 45 ~ 60 | −4 ~ +1 | −3 ~ 0 |
| 904 | — | — | — | — |
| 905 | 210 ~ 225 | 50 ~ 60 | −27 ~ −6 | −35 ~ −14 |
| 906 | 210 ~ 225 | 50 ~ 55 | −4 ~ −1 | −3 ~ +2 |
| 907 | 215 ~ 225 | 50 ~ 60 | 0 ~ +2 | +1 ~ +4 |
| 908 | 215 ~ 230 | 55 ~ 70 | −1 ~ +3 | 0 ~ +4 |
| 909 | 250 ~ 265 | 50 ~ 60 | −1 ~ +2 | 0 ~ +3 |
| 910 | 290 ~ 350 | 25 ~ 35 | −10 ~ −7 | −15 ~ −10 |

As is apparent from Tables 24 and 25, when the amount of bismuth oxide contained in the $Bi_2O_3$/$Sb_2O_3$ synthetic powder to be added had a weight ratio of 0.5 or more for 100 of zinc oxide, the zinc oxide varistor using the ceramics of this example had a great a value and the absolute value of the rate $\Delta V_{1mA}/V_{1mA}$ in the threshold voltage $V_{1mA}$ was 5% or less for long-time DC loading and surge so that great reliability could be obtained.

If the amount of the synthetic powder of bismuth oxide and antimony oxide to be added exceeds 20 parts by weight for 100 parts by weight of zinc oxide (sample No. 904), a plurality of molded bodies are overlapped and sintered so that sintered bodies stick together. Consequently, the production of the varistor in high quantities cannot be obtained. When the amount of antimony oxide contained in the bismuth oxide/antimony oxide synthetic powder to be added had a weight ratio of 0.01 to 10 for 100 of zinc oxide, good electric characteristics could be obtained. Referring to sample No. 910 in Table 24, the amount of the synthetic powder of bismuth oxide and antimony oxide to be added is much more than 20 parts by weight for 100 parts by weight of zinc oxide so that variations in the threshold voltage $V_{1mA}$ and the a value are increased as well as the rate of change in DC loading and surge, which is not preferable.

(Example 11)

A bismuth oxide ($Bi_2O_3$) powder, an antimony oxide ($Sb_2O_3$) powder (whose average particle sizes are about 2 to 3 μm), and boron oxide ($B_2O_3$) (whose average particle size is about 2 to 3 μm) were blended at a weight ratio of 97.5:2.0:0.5. The blended powder was heat treated at a temperature of 450° C. for 1 hr. in the air, and then ground fine by means of stabilizing zirconia balls in a monomalon pot. Consequently, a synthetic powder (whose average particle size is about 0.5 to 1.5 μm) was obtained. The synthetic powder which is prepared from bismuth oxide, antimony oxide and boron oxide is called a bismuth oxide/ antimony oxide/boron oxide synthetic powder.

A zinc oxide (ZnO) powder (whose average particle size is 0.3 μm), the bismuth oxide/antimony oxide/boron oxide synthetic powder, a cobalt oxide (CoO) powder (whose average particle size is about 0.5 to 1.5 μm), and a manganese dioxide ($MnO_2$) powder (the average particle size is about 2 to 3 μm) were blended at a weight ratio of 100:0.2 to 20.0:0.954:0.414 while changing the amount of the bismuth oxide/antimony oxide/ boron oxide synthetic powder. The blended powder was mixed and ground for 12 to 18 hrs. by a wet method by means of stabilizing zirconia balls in the monomalon pot so as to pass through a 325-mesh screen. The ground powder was dried, and compressed and molded into a disk. The temperature of the molded product thus obtained was raised at a rate of 50° C./hr in the air, held for 13 hrs. at a temperature of 950° C. and cooled at a temperature of 50° C./hr. Consequently, a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 26 shows the composition of samples and Table 27 shows the results of evaluation of the electric characteristics.

TABLE 26

| Sample No. | ZnO (part by wt) | $Bi_2O_3$—$Sb_2O_3$—$B_2O_3$ Synthetic powder (*) (part by wt) | CoO (part by wt) | $MnO_2$ (part by wt) |
|---|---|---|---|---|
| 1001 | 100.0 | 0.2 | 0.954 | 0.414 |
| 1002 | 100.0 | 0.5 | 0.954 | 0.414 |
| 1003 | 100.0 | 0.7 | 0.954 | 0.414 |
| 1004 | 100.0 | 1.0 | 0.954 | 0.414 |
| 1005 | 100.0 | 2.0 | 0.954 | 0.414 |

TABLE 26-continued

| Sample No. | ZnO (part by wt) | $Bi_2O_3$—$Sb_2O_3$—$B_2O_3$ Synthetic powder (*) (part by wt) | CoO (part by wt) | $MnO_2$ (part by wt) |
|---|---|---|---|---|
| 1006 | 100.0 | 5.0 | 0.954 | 0.414 |
| 1007 | 100.0 | 10.0 | 0.954 | 0.414 |
| 1008 | 100.0 | 15.0 | 0.954 | 0.414 |
| 1009 | 100.0 | 20.0 | 0.954 | 0.414 |

(*)Heat treatment of $Bi_2O_3$:$Sb_2O_3$:$B_2O_3$ = 97.5:2:0.5 (weight ratio)

TABLE 27

| Sample No. | $V_{1\,mA/mm}$ (V) | $0.1^\alpha$ 1 mA | Rate of change in DC loading $\Delta V_{1\,mA}/V_{1\,mA}$ (%) | Rate of change in surge $\Delta V_{1\,mA}/V_{1\,mA}$ (%) |
|---|---|---|---|---|
| 1001 | 170 ~ 240 | 22 ~ 35 | −60 ~ −35 | −55 ~ −36 |
| 1002 | 215 ~ 235 | 45 ~ 55 | −4 ~ 0 | −4 ~ −1 |
| 1003 | 225 ~ 240 | 45 ~ 60 | −3 ~ 0 | −2 ~ +2 |
| 1004 | 215 ~ 230 | 45 ~ 55 | 0 ~ +2 | −3 ~ +1 |
| 1005 | 220 ~ 235 | 50 ~ 60 | −2 ~ +1 | 0 ~ +4 |
| 1006 | 215 ~ 235 | 50 ~ 60 | −2 ~ +2 | −2 ~ +3 |
| 1007 | 210 ~ 230 | 50 ~ 65 | −4 ~ −1 | −1 ~ +3 |
| 1008 | 210 ~ 230 | 55 ~ 70 | −3 ~ −2 | 0 |
| 1009 | — | — | — | — |

As is apparent from Tables 26 and 27, the zinc oxide varistor produced by a method for producing a zinc oxide varistor according to the present invention had a high threshold voltage and the absolute value of the rate of change $\Delta V_{1mA}/V_{1mA}$ in the threshold voltage $V_{1mA}$ was 5% or less for long-time DC loading and surge so that great reliability could be obtained, except for sample No. 1001 having 0.2 part by weight of the synthetic powder of bismuth oxide, antimony oxide and boron oxide. As shown in Table 27, the electric characteristics within the batches had small variations. When the zinc oxide varistor was produced by the present producing method, a variation in the electric characteristics between the batches was small, similarly to a variation in the electric characteristics within the batches, which is not shown in Table 27. As a result, the product yield was considerably enhanced. When the amount of a $Bi_2O_3$/ $Sb_2O_3$ synthetic powder to be added exceeded 20 parts by wt, samples stuck together so that measurement could not be performed (see sample No. 1009).

(Comparative Example 2)

By the producing method according to the prior art, three kinds of zinc oxide varistors using a sintered body which has the same compositions as in Example 8 were produced.

A zinc oxide (ZnO) powder, a bismuth oxide ($Bi_2O_3$) powder, an antimony oxide ($Sb_2O_3$) powder, a boron oxide ($B_2O_3$) powder, cobalt oxide (CoO) powder, and a manganese dioxide ($MnO_2$) powder were blended at a weight ratio of 100:0.975:0.02:0.005:0.954:0.414 (Sample No. 1014), 100:1.95:0.04:0.01:0.954:0.414 (Sample No. 1015), and 100:4.875:0.1:0.025:0.954:0.414)(Sample No. 1016). The blended powder was mixed and ground by a wet method. The mixed powder thus obtained was dried and molded into a disk. The temperature of the molded body was raised at a rate of 50° C./hr in the air. Then, the molded body was held for 13 hrs. at a temperature of 950° C. Thereafter, the temperature of the molded body was lowered at a rate of 50° C./hr so that a sintered body was obtained. The sintered body had a thickness of 1.2 mm and a diameter of 14 mm.

In the same manner as in Example 8, a zinc oxide varistor was produced. The electric characteristics of the zinc oxide varistor thus obtained were evaluated. Table 28 shows the composition of sample, and Table 29 shows the results of evaluation of the electric characteristics.

TABLE 28

| Sample No. | ZnO (part by wt) | $Bi_2O_3$ (part by wt) | $Sb_2O_3$ (part by wt) | $B_2O_3$ (part by wt) | CoO (part by wt) | $MnO_2$ (part by wt) |
| --- | --- | --- | --- | --- | --- | --- |
| 1014 | 100.0 | 0.975 | 0.02 | 0.005 | 0.954 | 0.414 |
| 1015 | 100.0 | 1.95 | 0.04 | 0.01 | 0.954 | 0.414 |
| 1016 | 100.0 | 4.875 | 0.1 | 0.025 | 0.954 | 0.414 |

TABLE 29

| Sample No. | $V_{1 mA/mm}$ (V) | Rate of change in DC loading | | Rate of change in surge $\Delta V_{1 mA}/V_{1 mA}$(%) |
| --- | --- | --- | --- | --- |
| | | $0.1^\alpha$ 1 mA | $\Delta V_{1 mA}/V_{1 mA}$(%) | |
| 1014 | 220 ~ 310 | 20 ~ 42 | −43 ~ −18 | −54 ~ −41 |
| 1015 | 215 ~ 295 | 18 ~ 28 | −43 ~ −15 | −52 ~ −27 |
| 1016 | 210 ~ 315 | 25 ~ 38 | −38 ~ −13 | −64 ~ −43 |

As is apparent from Tables 28 and 29, the zinc oxide varistor produced by the producing method according to the prior art had $V_{1mA}$ decreased considerably after DC loading of 0.2W, and the absolute value of the rate of change in DC loading $\Delta V_{1mA}/V_{1mA}$ was 10% or more. In addition, the absolute value of the rate of change in surge greatly exceeded 10% so that reliability was very poor. As shown in Table 29, a variation within the batches was great.

A variation in the electric characteristics between the batches of the zinc oxide varistor produced by the method according to the prior art was much greater than a variation within the batches, which is not shown in Table 29.

More specifically, it is apparent that a sintering temperature of 950° C. is unsuitable for the production of the zinc oxide varistor because it is too low in the method according to the prior art. If sintering is performed at a temperature of 1250° C. by the method according to the prior art, a varistor having excellent characteristics can be obtained. However, if the sintering temperature is high as described above, it is necessary to use a material having higher heat resistance for a heater of an electric furnace for sintering, a material for a furnace wall, a container and the like, or to use a heater which can perform heating at a higher temperature. Consequently, equipment costs are increased. In addition, the production cost is increased as well as the power cost. According to such high-temperature sintering, about half or more of the bismuth oxide which has been added is evaporated during sintering so that the material for a furnace wall, the container and the like are corroded and broken down. In case of mass sintering, a variation in quality of a product is easily caused depending on the amount of the evaporated bismuth oxide. Accordingly, it is preferable that compositions which can be sintered at a low temperature according to the present invention should be used.

As is apparent from Example 11 and Comparative Example 2, the zinc oxide varistor produced by the low-temperature sintering producing method according to the present invention was more excellent in initial electric characteristics, reliability and variations in the electric characteristics within batches and between batches than the zinc oxide varistor produced by the method according to the prior art.

(Example 12)

A bismuth oxide powder (whose average particle size is about 2 to 3 μm) and an antimony oxide powder (whose average particle size is about 2 to 3 μm) were blended at a weight ratio of 85:15. The blended powder was heat treated at a temperature of 550° C. for 5 hrs. in the air. Further, bismuth oxide fine particles (whose average particle size is about 2 to 3 μm) and boron oxide fine powder (whose average particle size is about 2 to 3 μm) were blended at a weight ratio of 93:7. The blended powder was heat treated at a temperature of 600° C. for 10 mins. in the air. These were mixed at a weight ratio of 10:1 and ground fine for 18 hrs. by a wet method by means of stabilizing zirconia balls in a monomalon pot. Consequently, a synthetic powder of bismuth oxide/antimony oxide/boron oxide (whose average particle size is about 2 to 3 μm) was obtained.

A zinc oxide powder (whose average particle size is 0.3 μm), a $Bi_2O_3/Sb_2O_3/B_2O_3$ synthetic powder, a cobalt oxide powder (whose average particle size is about 0.5 to 1.5 μm), and a manganese dioxide powder (whose average particle size is about 2 to 3 μm) were blended at a weight ratio of 100:3.3:0.80:0.40. The blended powder was mixed and ground for 18 hrs. by a wet method by means of stabilizing zirconia balls in the monomalon pot. The powder thus obtained was dried and mixed with an aluminum nitrate solution which contains 0.0013 part by weight of aluminum oxide, based on $Al_2O_3$ conversion, for 100 parts by weight of zinc oxide, and then compressed and molded into a disk. The temperature of the molded body thus obtained was raised at a rate of 50° C./hr in the air. The molded body was held at a temperature of 750° C., 800° C., 900° C., 1000° C., 1050° C. and 1100° C. for 15 hrs. and then its temperature was lowered at a rate of 50° C./hr so that a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 30 shows the composition of samples, and Table 31 shows the results of evaluation of the electric characteristics.

TABLE 30

| Sample No. | Sintering temperature (°C.) | ZnO (part by wt) | $(Bi_2O_3/Sb_2O_3/B_2O_3)$ Synthetic fine particles | | CoO (part by wt) | $MnO_2$ (part by wt) | $Al_2O_3$ (part by wt) |
| --- | --- | --- | --- | --- | --- | --- | --- |
| | | | $Bi_2O_3/Sb_2O_3$ Synthetic fine particles (part by wt) (*) | $Bi_2O_3/B_2O_3$ Synthetic fine particles (part by wt) (**) | | | |
| 1101 | 750 | 100.0 | 3.0 | 0.3 | 0.80 | 0.400 | 0.0013 |
| 1102 | 800 | 100.0 | 3.0 | 0.3 | 0.80 | 0.400 | 0.0013 |
| 1103 | 900 | 100.0 | 3.0 | 0.3 | 0.80 | 0.400 | 0.0013 |

TABLE 30-continued

| Sample No. | Sintering temperature (°C.) | ZnO (part by wt) | $Bi_2O_3/Sb_2O_3$ Synthetic fine particles (part by wt) (*) | $Bi_2O_3/B_2O_3$ Synthetic fine particles (part by wt) (**) | CoO (part by wt) | $MnO_2$ (part by wt) | $Al_2O_3$ (part by wt) |
|---|---|---|---|---|---|---|---|
| 1104 | 1000 | 100.0 | 3.0 | 0.3 | 0.80 | 0.400 | 0.0013 |
| 1105 | 1050 | 100.0 | 3.0 | 0.3 | 0.80 | 0.400 | 0.0013 |
| 1106 | 1100 | 100.0 | 3.0 | 0.3 | 0.80 | 0.400 | 0.0013 |

(*)Heat treatment of a mixture $Bi_2O_3:Sb_2O_3$ = 85:15 (weight ratio)
(**)Heat treatment of a mixture $Bi_2O_3:B_2O_3$ = 93:7 weight ratio)

TABLE 31

| Sample No. | $V_{1mA/mm}$ (V) | Rate of change in DC loading $0.1^\alpha$ 1 mA $\Delta V_{1mA}/V_{1mA}(\%)$ | Rate of change in surge $\Delta V_{1mA}/V_{1mA}(\%)$ |
|---|---|---|---|
| 1101 | 290 ~ 340 | 40 ~ 56 −4 ~ 0 | −4 ~ +1 |
| 1102 | 270 ~ 310 | 45 ~ 55 −2 ~ 0 | −3 ~ 0 |
| 1103 | 260 ~ 290 | 50 ~ 54 −3 ~ −1 | −4 ~ 0 |
| 1104 | 250 ~ 275 | 50 ~ 60 −3 ~ 0 | −3 ~ +1 |
| 1105 | 235 ~ 260 | 60 ~ 65 −2 ~ +1 | −1 ~ +3 |
| 1106 | 230 ~ 250 | 60 ~ 70 −2 ~ 0 | 0 ~ +3 |

As is apparent from Tables 30 to 31, the zinc oxide varistor produced from the ceramics of this example as a result of sintering at a temperature of 750° to 1100° C. had a high threshold voltage, and the absolute value of the rate of change $\Delta V_{1mA}/V_{1mA}$ in the threshold voltage $V_{1mA}$ was 5% or less for long-time DC loading and surge so that great reliability could be obtained. As shown in Table 23, the electric characteristics within the batches had a small variation.

When the zinc oxide varistor was produced from the ceramics of this example, the variation in the electric characteristics between the batches was small, similarly to the variation in the electric characteristics within the batches, which is not shown in Table 31. While a sample using conventional compositions which are not heat treated had a process capability index of 1.0 with a standard range of ±5% of $V_{1mA}$ in a method according to the prior art, the process capability index for the present invention was increased to 1.33. As a result, while the sample using conventional compositions which are not heat treated had a yield of 90%, the yield was considerably increased to 95% in the present example.

(Example 13)

A bismuth oxide powder (whose average particle size is about 2 to 3 μm) and an antimony oxide fine powder (whose average particle size is about 2 to 3 μm) were blended at a weight of 70:30. The blended powder was heat treated at a temperature of 500° C. for 30 hrs. in the air. Further, a bismuth oxide powder (whose average particle size is about 2 to 3 μm) and a boron oxide fine powder (whose average particle size is about 2 to 3 μm) were blended. The blended powder was heat treated at a temperature of 450° C. for 1 hr. in the air. These were blended at a weight ratio of 97.5:2.5, 95.0:5.0, 92.5:7.5, 90.0:10.0, 87.5:12.5, 85.0:15.0, 82.5:17.5, and 80.0:20.0, and mixed and ground fine for 18 hrs. by a wet method by means of stabilizing zirconia balls in a monomalon pot. Consequently, eight kinds of synthetic powders of bismuth oxide/antimony oxide/boron oxide were obtained. When a heat treating temperature is increased, grinding becomes harder. For this reason, it is necessary to set the heat treating temperature to 700° C. or less.

A zinc oxide powder (whose average particle size is 0.3 μm), the synthetic powder of bismuth oxide, antimony oxide and boron oxide, a cobalt oxide powder (whose average particle size is about 0.5 to 1.5 μm), and a manganese dioxide powder (whose average particle size is about 2 to 3 μm) were blended at a weight ratio of 100:4.0:0.50:0.50. The blended powder was mixed and ground for 18 hrs. by the wet method by means of stabilizing zirconia balls in the monomalon pot. The powder thus obtained was dried and mixed with an aluminum nitrate solution which contains 0.0013 part by weight of aluminum oxide, based on $Al_2O_3$ conversion, for 100 parts by weight of zinc oxide, and then compressed and molded into a disk. The temperature of the molded body thus obtained was raised at a rate of 150° C./hr in the air. The molded body was held at a temperature of 1000° C. for 2 hrs. and then its temperature was lowered at a rate of 150° C./hr so that a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 32 shows the composition of samples, and Table 33 shows the results of evaluation of the electric characteristics.

TABLE 32

| Sample No. | ZnO (part by wt) | $Bi_2O_3/Sb_2O_3$ Synthetic fine particles (part by wt) (*) | $Bi_2O_3/B_2O_3$ Synthetic fine particles (part by wt) (**) | CoO (part by wt) | $MnO_2$ (part by wt) | $Al_2O_3$ (part by wt) |
|---|---|---|---|---|---|---|
| 1201 | 100.0 | 3.9 (97.5) | 0.1 (2.5) | 0.50 | 0.50 | 0.0013 |
| 1202 | 100.0 | 3.8 (95.0) | 0.2 (5.0) | 0.50 | 0.50 | 0.0013 |
| 1203 | 100.0 | 3.7 (92.5) | 0.3 (7.5) | 0.50 | 0.50 | 0.0013 |
| 1204 | 100.0 | 3.6 (90.0) | 0.4 (10.0) | 0.50 | 0.50 | 0.0013 |
| 1205 | 100.0 | 3.5 (87.5) | 0.5 (12.5) | 0.50 | 0.50 | 0.0013 |
| 1206 | 100.0 | 3.4 (85.0) | 0.6 (15.0) | 0.50 | 0.50 | 0.0013 |
| 1207 | 100.0 | 3.3 (82.5) | 0.7 (17.5) | 0.50 | 0.50 | 0.0013 |
| 1208 | 100.0 | 3.2 (80.0) | 0.8 (20.0) | 0.50 | 0.50 | 0.0013 |

(*)Heat treatment of a mixture $Bi_2O_3:Sb_2O_3$ = 70:30 (weight ratio)
(**)Heat treatment of a mixture $Bi_2O_3:B_2O_3$ = 85:15 weight ratio)

TABLE 33

| Sample No. | $V_{1 mA/mm}$ (V) | $0.1^\alpha$ 1 mA | Rate of change in DC loading $\Delta V_{1 mA}/V_{1 mA}(\%)$ | Rate of change in surge $\Delta V_{1 mA}/V_{1 mA}(\%)$ |
|---|---|---|---|---|
| 1201 | 210 ~ 245 | 40 ~ 55 | -3 ~ -1 | -4 ~ 0 |
| 1202 | 205 ~ 230 | 40 ~ 55 | -1 ~ -1 | -4 ~ +1 |
| 1203 | 200 ~ 225 | 45 ~ 55 | -3 ~ +1 | -2 ~ +1 |
| 1204 | 195 ~ 225 | 45 ~ 55 | -3 ~ 0 | -1 ~ +3 |
| 1205 | 180 ~ 210 | 43 ~ 52 | -1 ~ +1 | -3 ~ 0 |
| 1206 | 174 ~ 195 | 50 ~ 60 | -3 ~ 0 | -4 ~ +1 |
| 1207 | 150 ~ 185 | 50 ~ 65 | -3 ~ 0 | -3 ~ +1 |
| 1208 | 155 ~ 186 | 55 ~ 65 | -4 ~ 0 | 0 ~ +3 |

As is apparent from Tables 32 and 33, the zinc oxide varistor using the ceramics of this example had a great α value and the absolute value of the rate of change $\Delta V_{1mA}/V_{1mA}$ in the threshold voltage $V_{1mA}$ was 5% or less for long-time DC loading and surge so that great reliability could be obtained.

Numeric values in parentheses of the column of synthetic fine particles shown in Table 32 indicate the weight ratios of the synthetic powder of bismuth oxide/antimony oxide and a synthetic powder of bismuth oxide/boron oxide.

(Example 14)

A bismuth oxide ($Bi_2O_3$) powder, an antimony oxide ($Sb_2O_3$) powder (whose average particle sizes are about 2 to 3 μm), and a chromium oxide ($Cr_2O_3$) (whose average particle size is about 0.5 to 1.5 μm) were blended at a weight of 97:2:1. The blended powder was heat treated at a temperature of 600° C. for 30 mins. in the air, and then ground fine by means of stabilizing zirconia balls in a monomalon pot. Consequently, a synthetic powder (whose average particle size is about 0.5 to 1.5 μm) was obtained. The synthetic powder which is prepared from bismuth oxide, antimony oxide and chromium oxide is called a bismuth oxide/antimony oxide/chromium oxide synthetic powder.

A zinc oxide (ZnO) powder (whose average particle size is 0.3 μm), the bismuth oxide/antimony oxide/chromium oxide synthetic powder, a cobalt oxide (CoO) powder (whose average particle size is about 0.5 to 1.5 μm), and a manganese dioxide ($MnO_2$) powder (whose average particle size is about 2 to 3 μm) were blended at a weight ratio of 100:0.2 to 25.0:0.954:0.414 while changing the amount of the bismuth oxide/antimony oxide/chromium oxide synthetic powder. The blended powder was mixed and ground for 18 hrs. by a wet method by means of stabilizing zirconia balls in the monomalon pot so as to pass through a 325-mesh screen. The ground powder was dried, and compressed and molded into a disk. The temperature of the molded product thus obtained was raised at a rate of 50° C./hr in the air, held for 11 hrs. at a temperature of 900° C. and lowered at a rate of 50° C./hr. Consequently, a sintered body was obtained. The sintered body had a thickness of 1.2 mm and a diameter of 14 mm.

Table 34 shows the composition of samples, and Table 35 shows the results of evaluation of the electric characteristics. The numeric values which show the result of evaluation of the electric characteristics are minimum and maximum values within batches.

TABLE 34

| Sample No. | ZnO (part by wt) | $Bi_2O_3$—$Sb_2O_3$—$Cr_2O_3$ Synthetic powder (*) (part by wt) | CoO (part by wt) | $MnO_2$ (part by wt) |
|---|---|---|---|---|
| 1301 | 100.0 | 0.2 | 0.954 | 0.414 |
| 1302 | 100.0 | 0.5 | 0.954 | 0.414 |
| 1303 | 100.0 | 0.7 | 0.954 | 0.414 |
| 1304 | 100.0 | 1.0 | 0.954 | 0.414 |
| 1305 | 100.0 | 2.0 | 0.954 | 0.414 |
| 1306 | 100.0 | 5.0 | 0.954 | 0.414 |
| 1307 | 100.0 | 10.0 | 0.954 | 0.414 |
| 1308 | 100.0 | 20.0 | 0.954 | 0.414 |
| 1309 | 100.0 | 25.0 | 0.954 | 0.414 |

(*)Heat treatment of a mixture $Bi_2O_3:Sb_2O_3:Cr_2O_3 = 97:2:1$ (weight ratio)

TABLE 35

| Sample No. | $V_{1 mA/mm}$ (V) | $0.1^\alpha$ 1 mA | Rate of change in DC loading $\Delta V_{1 mA}/V_{1 mA}(\%)$ | Rate of change in surge $\Delta V_{1 mA}/V_{1 mA}(\%)$ |
|---|---|---|---|---|
| 1301 | 185 ~ 212 | 14 ~ 30 | -30 ~ -18 | -31 ~ -10 |
| 1302 | 230 ~ 255 | 40 ~ 54 | -3 ~ -2 | -3 ~ -1 |
| 1303 | 230 ~ 245 | 43 ~ 55 | -1 ~ +3 | -3 ~ 0 |
| 1304 | 225 ~ 255 | 45 ~ 65 | -1 ~ +3 | -3 ~ +2 |
| 1305 | 220 ~ 240 | 50 ~ 60 | -1 ~ +1 | 0 ~ +2 |
| 1306 | 215 ~ 235 | 52 ~ 63 | -2 ~ 0 | -2 ~ +2 |
| 1307 | 213 ~ 233 | 49 ~ 54 | 0 ~ +3 | -2 ~ +2 |
| 1308 | 208 ~ 243 | 52 ~ 64 | -1 ~ +4 | -2 ~ +2 |
| 1309 | — | — | — | — |

As is apparent from Tables 34 and 35, the zinc oxide varistor produced by the method according to the present invention had excellent initial characteristics and the absolute value of the rate of change $\Delta V_{1mA}/V_{1mA}$ in the threshold voltage $V_{1mA}$ was 5% or less for the long-time DC loading and surge so that great reliability could be obtained, except for sample No. 1301 having 0.2 part by weight of a bismuth oxide/antimony oxide/chromium oxide synthetic powder. As shown in Table 35, the electric characteristics within batches had a small variation.

When the zinc oxide varistor was produced by the method according to the present invention, the variation in electric characteristics between batches was small, similar to the variation in electric characteristics within batches, which is not shown in Table 35. As a result, the product yield was considerably enhanced. When the amount of the $Bi_2O_3$—$Sb_2O_3$ synthetic powder to be added exceeded 20 parts by weight, a plurality of samples which were superposed and sintered stuck together so that measurement could not be performed (sample No. 1309).

(Comparative Example 3)

By using a sintered body having the same composition as in Example 7, three kinds of zinc oxide varistors were produced by the method according to the prior art.

A zinc oxide (ZnO) powder, a bismuth oxide ($Bi_2O_3$) powder, an antimony oxide ($Sb_2O_3$) powder, a chromium oxide ($Cr_2O_3$) powder, a cobalt oxide (CoO) powder and a manganese dioxide ($MnO_2$) powder were blended at a weight ratio of 100:0.97:0.02:0.01:0.954:0.414 (sample No. 1314), 100:1.94:0.04:0.02:0.954:0.414 (sample No. 1315) and 100:4.85:0.1:0.05:0.954:0.414 (sample No. 1316). The blended powder was mixed and ground by a wet method. The mixed powder thus obtained was dried, and compressed and molded into a disk. The temperature of the molded body was raised at a rate of 50° C./hr in the air. Then, the molded body was held for 13 hrs. at a temperature of 900° C. Thereafter, the temperature of the molded body was lowered at a rate of 50° C./hr so that a sintered body was obtained. The sintered body had a thickness of 1.2 mm and a diameter of 14 mm.

In the same manner as in Example 8, a zinc oxide varistor was produced. The electric characteristics of the zinc oxide varistor thus obtained were evaluated in the same way as in Example 8. Table 86 shows the composition of samples, and Table 37 shows the results of evaluation of the electric characteristics.

TABLE 36

| Sample No. | ZnO (part by wt) | $Bi_2O_3$ (part by wt) | $Sb_2O_3$ (part by wt) | $Cr_2O_3$ (part by wt) | CoO (part by wt) | $MnO_2$ (part by wt) |
|---|---|---|---|---|---|---|
| 1314 | 100.0 | 0.97 | 0.02 | 0.01 | 0.954 | 0.414 |
| 1315 | 100.0 | 1.94 | 0.04 | 0.02 | 0.954 | 0.414 |
| 1316 | 100.0 | 4.85 | 0.1 | 0.05 | 0.954 | 0.414 |

TABLE 37

| Sample No. | $V_{1\,mA/mm}$ (V) | $0.1^\alpha$ 1 mA $\Delta V_{1\,mA}/V_{1\,mA}(\%)$ | Rate of change in DC loading $\Delta V_{1\,mA}/V_{1\,mA}(\%)$ | Rate of change in surge $\Delta V_{1\,mA}/V_{1\,mA}(\%)$ |
|---|---|---|---|---|
| 1314 | 245 ~ 290 | 16 ~ 38 | −45 ~ −32 | −30 ~ −15 |
| 1315 | 212 ~ 245 | 25 ~ 40 | −35 ~ −12 | −30 ~ −11 |
| 1316 | 235 ~ 290 | 22 ~ 35 | −42 ~ −25 | −32 ~ −24 |

As is apparent from Tables 36 and 37, the zinc oxide varistor produced by the producing method according to the prior art had $V_{1mA}$ decreased considerably after DC loading of 0.2W, and the absolute value of the rate of change in DC loading A $V_{1mA}/V_{1mA}$ was 10% or more. In addition, the absolute value of the rate of change in surge exceeded 10% so that reliability was very poor. As shown in Table 37, a variation within the batches was great.

A variation in the electric characteristics between the batches of the zinc oxide varistor produced by the method according to the prior art was much greater than a variation in the electric characteristics within the batches, which is not shown in Table 37. Many varistors had V1 mA/mm and an α value which are lower than the values shown in Table 20.

More specifically, it is apparent that a sintering temperature of 900° C. is unsuitable for the production of the zinc oxide varistor because it is too low in the method according to the prior art. If sintering is performed at a temperature of 1250° C. by the method according to the prior art, a varistor having excellent characteristics can be obtained. However, if the sintering temperature should be increased to obtain a sintered body of good quality, there are various disadvantages as described above.

As is apparent from Example 14 and Comparative Example 3, the zinc oxide varistor produced by the low-temperature sintering producing method according to the present invention was more excellent in initial electric characteristics, reliability and variations in the electric characteristics within batches and between batches than the zinc oxide varistor produced by the method according to the prior art.

(Example 15)

A bismuth oxide powder (whose average particle size is about 2 to 3 μm) and an antimony oxide powder (whose average particle size is about 2 to 3 μm) were blended at a weight ratio of 85:15. The blended powder was heat treated at a temperature of 550° C. for 5 hrs. in the air. Further, bismuth oxide fine particles (whose average particle size is about 2 to 3 μm) and chromium oxide fine powder (whose average particle size is about 0.5 to 1.5 μm) were mixed at a weight ratio of 75:25. The mixed powder was heat treated at a temperature of 550° C. for 5 hrs. in the air. These were blended at a weight ratio of 10:1 and ground fine for 18 hrs. by a wet method by means of stabilizing zirconia balls in a monomalon pot. Consequently, a synthetic powder of bismuth oxide/antimony oxide/chromium oxide (whose average particle size is about 2 to 3 μm) was obtained.

A zinc oxide powder (whose average particle size is 0.3 μm), a $Bi_2O_3/Sb_2O_3/Cr_2O_3$ synthetic powder, a cobalt oxide powder (whose average particle size is about 0.5 to 1.5 μm), and a manganese dioxide powder (whose particles pass through a 200 mesh screen) were blended at a weight ratio of 100:3.3:0.80:0.40. The blended powder was mixed and ground for 18 hrs. by a wet method by means of stabilizing zirconia balls in the monomalon pot. The powder thus obtained was dried and mixed with an aluminum nitrate solution which contains 0.0013 part by weight of aluminum oxide, based on $Al_2O_3$ conversion, for 100 parts by weight of zinc oxide, and then compressed and molded into a disk. The temperature of the molded body thus obtained was raised at a rate of 150° C./hr in the air. The molded body was held at a temperature of 800° C., 850° C., 800° C., 1000° C., 1050° C. and 1100° C. for 15 hrs. and then its temperature was lowered at a rate of 150° C. hr so that a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 38 shows the composition of samples, and Table 39 shows the results of evaluation of the electric characteristics.

TABLE 38

| Sample No. | Sintering temperature (°C.) | ZnO (part by wt) | ($Bi_2O_3/Sb_2O_3/Cr_2O_3$) Synthetic fine particles $Bi_2O_3/Sb_2O_3$ Synthetic fine particles (part by wt) (*) | ($Bi_2O_3/Sb_2O_3/Cr_2O_3$) Synthetic fine particles $Bi_2O_3/B_2O_3$ Synthetic fine particles (part by wt) (**) | CoO (part by wt) | $MnO_2$ (part by wt) | $Al_2O_3$ (part by wt) |
|---|---|---|---|---|---|---|---|
| 1401 | 800 | 100.0 | 3.0 | 0.3 | 0.80 | 0.400 | 0.0013 |
| 1402 | 850 | 100.0 | 3.0 | 0.3 | 0.80 | 0.400 | 0.0013 |
| 1403 | 900 | 100.0 | 3.0 | 0.3 | 0.80 | 0.400 | 0.0013 |
| 1404 | 1000 | 100.0 | 3.0 | 0.3 | 0.80 | 0.400 | 0.0013 |

TABLE 38-continued

| Sample No. | Sintering temperature (°C.) | ZnO (part by wt) | Bi₂O₃/Sb₂O₃ Synthetic fine particles (part by wt) (*) | Bi₂O₃/B₂O₃ Synthetic fine particles (part by wt) (**) | CoO (part by wt) | MnO₂ (part by wt) | Al₂O₃ (part by wt) |
|---|---|---|---|---|---|---|---|
| | | | (Bi₂O₃/Sb₂O₃/Cr₂O₃) Synthetic fine particles | | | | |
| 1405 | 1050 | 100.0 | 3.0 | 0.3 | 0.80 | 0.400 | 0.0013 |
| 1406 | 1100 | 100.0 | 3.0 | 0.3 | 0.80 | 0.400 | 0.0013 |

(*)Heat treatment of a mixture Bi₂O₃:Sb₂O₃ = 85:15 (weight ratio)
(**)Heat treatment of a mixture Bi₂O₃:B₂O₃ = 75:25 weight ratio)

TABLE 39

| Sample No. | $V_{1\,mA/mm}$ (V) | $0.1^\alpha$ ~ 1 mA | Rate of change in DC loading $\Delta V_{1\,mA}/V_{1\,mA}(\%)$ | Rate of change in surge $\Delta V_{1\,mA}/V_{1\,mA}(\%)$ |
|---|---|---|---|---|
| 1401 | 305 ~ 340 | 38 ~ 47 | −3 ~ 0 | −3 ~ +1 |
| 1402 | 290 ~ 330 | 42 ~ 48 | −2 ~ +2 | −1 ~ +3 |
| 1403 | 275 ~ 315 | 45 ~ 52 | −2 ~ +2 | −2 ~ +3 |
| 1404 | 270 ~ 305 | 50 ~ 56 | −1 ~ +2 | −2 ~ +2 |
| 1405 | 265 ~ 290 | 48 ~ 58 | 0 ~ +3 | −1 ~ +2 |
| 1406 | 265 ~ 285 | 52 ~ 58 | 0 ~ +3 | −1 ~ +3 |

As is apparent from Tables 38 to 39, the zinc oxide varistor produced by the method according to the present invention as a result of sintering at a temperature of 800° to 1100° C. had the absolute value of the rate of change $\Delta V_{1mA}/V_{1mA}$ in the threshold voltage $V_{1mA}$ of 5% or less for long-time DC loading and surge so that great reliability could be obtained. As shown in Table 39, the electric characteristics within the batches had a small variation.

When the zinc oxide varistor was produced by the method according to this method, the variation in the electric characteristics between the batches was small, similar to the variation in the electric characteristics within the batches, which is not shown in Table 39. Thus, the product yield was enhanced considerably.

(Example 16)

A bismuth oxide powder (whose average particle size is about 2 to 3 μm) and an antimony oxide fine powder (whose average particle size is about 2 to 3 μm) were blended at a weight of 70:30. The blended powder was heat treated at a temperature of 500° C. for 30 mins. in the air. Further, bismuth oxide fine particles (whose average particle size is about 2 to 3 μm) and a chromium oxide fine powder (whose average particle size is about 2 to 3 μm) were mixed at a molar ratio of 60:40. The mixed powder was heat treated at a temperature of 600° C. for 2 hrs. in the air.

These were blended at a ratio of 87.5:2.5, 95.0:5.0 92.5:7.5, 90.0:10.0, 87.5:12.5, 85.0:15.0, 82.5:17.5, and 80.0:20.0, and ground fine. Thus, eight kinds of bismuth oxide antimony oxide/chromium oxide synthetic powders were obtained.

A zinc oxide powder, the bismuth oxide/antimony oxide/ chromium oxide synthetic powder, a cobalt oxide powder, and a manganese dioxide powder were blended at a weight ratio of 100:4.0:0.50:0.50. The blended powder was mixed and ground by a wet method. The powder thus obtained was dried and mixed with an aluminum nitrate solution which contains 0.0013 part by weight of aluminum oxide, based on Al₂O₃ conversion, for 100 parts by weight of zinc oxide, and then compressed and molded into a disk. The temperature of the molded body thus obtained was raised at a rate of 50° C./hr in the air. The molded body was held at a temperature of 950° C. for 12 hrs. and then its temperature was lowered at a rate of 50° C./hr so that a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 40 shows the composition of samples, and Table 41 shows the results of evaluation of the electric characteristics.

TABLE 40

| Sample No. | ZnO (part by wt) | Bi₂O₃/Sb₂O₃ Synthetic fine particles (part by wt) (*) | Bi₂O₃/Cr₂O₃ Synthetic fine particles (part by wt) (**) | CoO (part by wt) | MnO₂ (part by wt) | Al₂O₃ (part by wt) |
|---|---|---|---|---|---|---|
| | | (Bi₂O₃/Sb₂O₃/Cr₂O₃) Synthetic fine particles | | | | |
| 1501 | 100.0 | 3.9 (97.5) | 0.1 (2.5) | 0.50 | 0.50 | 0.0013 |
| 1502 | 100.0 | 3.8 (95.0) | 0.2 (5.0) | 0.50 | 0.50 | 0.0013 |
| 1503 | 100.0 | 3.7 (92.5) | 0.3 (7.5) | 0.50 | 0.50 | 0.0013 |
| 1504 | 100.0 | 3.6 (90.0) | 0.4 (10.0) | 0.50 | 0.50 | 0.0013 |
| 1505 | 100.0 | 3.5 (87.5) | 0.5 (12.5) | 0.50 | 0.50 | 0.0013 |
| 1506 | 100.0 | 3.4 (85.0) | 0.6 (15.0) | 0.50 | 0.50 | 0.0013 |
| 1507 | 100.0 | 3.3 (82.5) | 0.7 (17.5) | 0.50 | 0.50 | 0.0013 |
| 1508 | 100.0 | 3.2 (80.0) | 0.8 (20.0) | 0.50 | 0.50 | 0.0013 |

(*)Heat treatment of a mixture Bi₂O₃:Sb₂O₃ = 70:30 (weight ratio)
(**)Heat treatment of a mixture Bi₂O₃:Cr₂O₃ = 60:40 weight ratio)

TABLE 41

| Sample No. | $V_{1\,mA/mm}$ (V) | $0.1^\alpha$ ~ 1 mA | Rate of change in DC loading $\Delta V_{1\,mA}/V_{1\,mA}(\%)$ | Rate of change in surge $\Delta V_{1\,mA}/V_{1\,mA}(\%)$ |
|---|---|---|---|---|
| 1501 | 240 ~ 270 | 42 ~ 50 | −3 ~ +2 | −2 ~ +2 |
| 1502 | 255 ~ 275 | 48 ~ 53 | −1 ~ +3 | −2 ~ 0 |
| 1503 | 240 ~ 270 | 44 ~ 49 | −1 ~ +4 | −2 ~ +1 |
| 1504 | 265 ~ 285 | 51 ~ 57 | −2 ~ 0 | −1 ~ +2 |
| 1505 | 230 ~ 260 | 45 ~ 55 | −4 ~ 0 | −2 ~ 0 |
| 1506 | 245 ~ 265 | 52 ~ 57 | −4 ~ −1 | −3 ~ +1 |
| 1507 | 250 ~ 265 | 48 ~ 56 | −1 ~ +2 | −1 ~ +3 |
| 1508 | 260 ~ 275 | 54 ~ 60 | −3 ~ 0 | −2 ~ +1 |

As is apparent from Tables 40 and 41, the zinc oxide varistor produced by the method according to the present invention has a great a value and the absolute value of the rate of change $\Delta V_{1mA}/V_{1mA}$ of the threshold voltage $V_{1mA}$ was 5% or less for long-time DC loading and surge so that great reliability could be obtained.

Numeric values in parentheses of the column of synthetic fine particles shown in Table 41 indicate weight ratios of the synthetic powders of bismuth oxide/antimony oxide and bismuth oxide/chromium oxide.

(Example 17)

A bismuth oxide ($Bi_2O_3$) powder, an antimony oxide ($Sb_2O_3$) powder (whose average particle sizes are 2 to 3 μm), a chromium oxide ($Cr_2O_3$) powder (whose average particle size is about 0.5 to 1.5 μm) and a boron oxide ($B_2O_3$) powder (whose average particle size is about 2 to 3 μm) were mixed at a weight of 96.5:2:1:0.5. The mixed powder was heat treated at a temperature of 500° C. for 30 mins. in the air, and then ground fine by means of stabilizing zirconia balls in a monomalon pot. Consequently, a synthetic powder (whose average particle size is about 0.5 to 1.5 μm) was obtained. The synthetic powder which is prepared from bismuth oxide, antimony oxide, chromium oxide and boron oxide is called a bismuth oxide/antimony oxide/chromium oxide/boron oxide synthetic powder.

A zinc oxide (ZnO) powder (whose average particle size is 0.3 μm), the bismuth oxide/antimony oxide/chromium oxide/boron oxide synthetic powder, a cobalt oxide (CoO) powder (whose average particle size is about 0.5 to 1.5 μm), and a manganese dioxide ($MnO_2$) powder (whose average particle size is about 2 to 3 μm) were blended at a weight ratio of 100:0.2 to 25.0:0.954:0.414 while changing the amount of the bismuth oxide/antimony oxide/chromium oxide/boron oxide synthetic powder. The blended powder was mixed and ground for 12 to 18 hrs. by means of stabilizing zirconia balls in a monomalon pot so as to pass through a 325-mesh screen, In the same manner as in Example 8, a zinc oxide varistor was produced. The electric characteristics of the zinc oxide varistor thus obtained were evaluated in the same way as in Example 8. Table 42 shows the composition of samples, and Table 43 shows the results of evaluation of the electric characteristics.

TABLE 42

| Sample No. | ZnO (part by wt) | $Bi_2O_3/Sb_2O_3/Cr_2O_3/B_2O_3$ Synthetic powder (*) (part by wt) | CoO (part ty wt) | $MnO_2$ (part by wt) |
| --- | --- | --- | --- | --- |
| 1601 | 100.0 | 0.2 | 0.954 | 0.414 |
| 1602 | 100.0 | 0.5 | 0.954 | 0.414 |
| 1603 | 100.0 | 0.7 | 0.954 | 0.414 |
| 1604 | 100.0 | 1.0 | 0.954 | 0.414 |
| 1605 | 100.0 | 2.0 | 0.954 | 0.414 |
| 1606 | 100.0 | 5.0 | 0.954 | 0.414 |
| 1607 | 100.0 | 10.0 | 0.954 | 0.414 |
| 1608 | 100.0 | 20.0 | 0.954 | 0.414 |
| 1609 | 100.0 | 25.0 | 0.954 | 0.414 |

(*)Heat treatment of $Bi_2O_3:Sb_2O_3:Cr_2O_3:B_2O_3$ = 96.5:2:1:0.5 (weight ratio)

TABLE 43

| Sample No. | $V_{1\ mA/mm}$ (V) | 0.1$^\alpha$ 1 mA | Rate of change in DC loading $\Delta V_{1\ mA}/V_{1\ mA}$(%) | Rate of change in surge $\Delta V_{1\ mA}/V_{1\ mA}$(%) |
| --- | --- | --- | --- | --- |
| 1601 | 175 ~ 250 | 21 ~ 28 | −17 ~ −11 | −22 ~ −13 |
| 1602 | 190 ~ 215 | 43 ~ 48 | −3 ~ −1 | −4 ~ 0 |
| 1603 | 190 ~ 225 | 44 ~ 48 | 0 ~ +3 | −2 ~ +2 |
| 1604 | 210 ~ 235 | 45 ~ 52 | +1 ~ +3 | −1 ~ +2 |
| 1605 | 205 ~ 230 | 46 ~ 54 | 0 ~ +3 | −1 ~ +2 |
| 1606 | 200 ~ 225 | 51 ~ 58 | −1 ~ +2 | −2 ~ +2 |
| 1607 | 210 ~ 240 | 50 ~ 59 | −3 ~ +1 | −2 ~ +2 |
| 1608 | 205 ~ 230 | 52 ~ 58 | −3 ~ 0 | −1 ~ +3 |
| 1609 | — | — | — | — |

As is apparent from Tables 42 and 43, the zinc oxide varistor produced by the method according to the present invention had the absolute value of the rate of change $\Delta V_{1mA}/V_{1mA}$ in the threshold voltage $V_{1mA}$ was 5% or less for the long-time DC loading and surge so that great reliability could be obtained. As shown in Table 43, the electric characteristics within batches had a small variation.

When the zinc oxide varistor was produced from the ceramics of this example, the variation in the electric characteristics between the batches was small, similarly to the variation in the electric characteristics within the batches, which is not shown in Table 43. While a sample using conventional compositions which are not heat treated had a process capability index of 1.0 or less with a standard range of ±7% of $V_{1mA}$ in a method according to the prior art, the process capability index for the present invention was increased to 1.333. As a result, while the sample using conventional compositions which are not heat treated had a yield of 90%, the yield was considerably increased to 95% in the present example. When the amount of the $Bi_2O_3/TiO_2/Sb_2O_3/Cr_2O_3/B_2O_3$ synthetic powder to be added exceeded 20 parts by weight, samples stuck together so that measurement could not be performed (sample No. 1609). Accordingly, 0.5 to 20 parts by weight of the synthetic powder to be added is preferable for 100 parts by weight of a ZnO powder.

(Comparative Example 4)

By using a sintered body having the same compositions as in Example 17, three kinds of zinc oxide varistors were produced by the method according to the prior art.

A zinc oxide (ZnO) powder, bismuth oxide ($Bi_2O_3$) powder, a titanium oxide fine powder ($TiO_2$), an antimony oxide ($Sb_2O_3$) powder, a chromium oxide ($Cr_2O_3$) powder, a boron oxide ($B_2O_3$), a cobalt oxide (CoO) powder and a manganese oxide ($MnO_2$) powder were blended at a weight ratio of 100:0.88:0.085:0.02:0.01:0.005:0.954:0.414 (sample No. 1814), 100:1.76:0.17:0.04:0.02:0.010:0.954:0.414 (sample No. 1615), and 100:4.4:0.425:0.1:0.05:0.025:0.954:0.414 (sample No. 1616). The blended powder was mixed and ground by a wet method. The mixed powder thus obtained was dried, and compressed and molded into a disk. The temperature of the molded body was raised at a rate of 50° C./hr in the air. Then, the molded body was held for 2 hrs. at a temperature of 950° C. Thereafter, the temperature of the molded body was lowered at a rate of 50° C./hr so that a sintered body was obtained. The sintered body had a thickness of 1.2 mm and a diameter of 14 mm.

In the same manner as in Example 8, a zinc oxide varistor was produced. The electric characteristics of the zinc oxide varistor thus obtained were evaluated in the same way as in Example 8. Table 44 shows the composition of samples, and Table 45 shows the results of evaluation of the electric characteristics.

TABLE 44

| Sample No. | ZnO (part by wt) | $Bi_2O_3$ (part by wt) | $Sb_2O_3$ (part by wt) | $Cr_2O_3$ (part by wt) | $B_2O_3$ (part by wt) | CoO (part by wt) | $MnO_2$ (part by wt) |
| --- | --- | --- | --- | --- | --- | --- | --- |
| 1614 | 100.0 | 0.88 | 0.02 | 0.01 | 0.005 | 0.954 | 0.414 |
| 1615 | 100.0 | 1.76 | 0.04 | 0.02 | 0.01 | 0.954 | 0.414 |
| 1616 | 100.0 | 4.4 | 0.10 | 0.05 | 0.025 | 0.954 | 0.414 |

TABLE 45

| Sample No. | $V_{1\ mA/mm}$ (V) | $0.1^\alpha$ 1 mA | Rate of change in DC loading $\Delta V_{1\ mA}/V_{1\ mA}$(%) | Rate of change in surge $\Delta V_{1\ mA}/V_{1\ mA}$(%) |
|---|---|---|---|---|
| 1614 | 150 ~ 260 | 25 ~ 34 | −16 ~ −10 | −23 ~ −12 |
| 1615 | 145 ~ 265 | 21 ~ 43 | −14 ~ −7 | −16 ~ −10 |
| 1616 | 195 ~ 225 | 22 ~ 45 | −22 ~ −14 | −21 ~ −12 |

As is apparent from Tables 44 and 45, the zinc oxide varistor produced by the method according to the prior art had $V_{1mA}$ decreased considerably after DC loading of 0.2W, and the absolute value of the rate of change in DC loading $\Delta V_{1mA}/V_{1mA}$ was 10% or more. In addition, the absolute value of the rate of change in surge exceeded 10% so that reliability was very poor. As shown in Table 45, a variation within the batches was great.

A variation in the electric characteristics between the batches of the zinc oxide varistor produced by the method according to the prior art was much greater than a variation in the electric characteristics within the batches, which is not shown in Table 45. Many varistors had $V_{1mA/mm}$ and an $\alpha$ value which are lower than the values shown in Table 28.

More specifically, it is apparent that a sintering temperature of 950° C. is unsuitable for the production of the zinc oxide varistor because it is too low in case of compositions blended by the method according to the prior art. If sintering is performed at a temperature of 1250° C. by the method according to the prior art, a varistor having excellent characteristics can be obtained. However, if the sintering temperature should be increased to obtain a sintered body of good quality, there are various disadvantages as described above.

As is apparent from Example 17 and a Comparative Example 4, the zinc oxide varistor produced by the low-temperature sintering producing method according to the present invention was more excellent in initial electric characteristics, reliability and variations in the electric characteristics within batches and between batches than the zinc oxide varistor produced by the method according to the prior art.

(Example 18)

A bismuth oxide powder (whose average particle size is about 2 to 3 μm) and an antimony oxide powder (whose average particle size is about 2 to 3 μm) were mixed at a weight ratio of 85:15. The blended powder was heat treated at a temperature of 550° C. for 5 hrs. in the air. Further, bismuth oxide fine particles (whose average particle size is about 2 to 3 μm) and a chromium oxide fine powder (whose average particle size is about 0.5 to 1.5 μm) were mixed at a weight ratio of 75:25. The mixed powder was heat treated at a temperature of 600° C. for 10 min. in the air. A bismuth oxide powder (whose average particle size is about 2 to 3 μm) and a boron oxide fine powder (whose average particle size is about 2 to 3 μm) were mixed at a weight ratio of 93:7. The mixed powder was heat treated at a temperature of 600° C. for 10 min. in the air. These were mixed at a weight ratio of 3.0:0.3:0.3 and ground fine for 18 hrs. by means of stabilizing zirconia balls in a monomalon pot. Consequently, a synthetic powder of bismuth oxide/antimony oxide/ chromium oxide/boron oxide synthetic powder (whose average particle size is about 2 to 3 μm) was obtained.

A zinc oxide powder (whose average particle size is 0.3 μm), the $Bi_2O_3/Sb_2O_3/Cr_2O_3/B_2O_3$ synthetic powder, a cobalt oxide powder (whose average particle size is about 0.5 to 1.5 μm), and a manganese dioxide powder (whose average particle size is about 2 to 3 μm) were blended at a weight ratio of 100:3.6:0.80:0.40. The blended powder was mixed and ground for 18 hrs. by a wet method by means of stabilizing zirconia balls in the monomalon pot. The powder thus obtained was dried and mixed with an aluminum nitrate solution which contains 0.0013 part by weight of aluminum oxide, based on $Al_2O_3$ conversion, for 100 parts by weight of zinc oxide, and then compressed and molded into a disk. The temperature of the molded body thus obtained was raised at a rate of 150° C./hr in the air. The molded body was held at a temperature of 800° C., 850°, 900° C., 1000° C., 1050° C. and 1100° C. for 15 hrs. and then its temperature was lowered at a rate of 150° C. hr so that a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 46 shows the composition of samples, and Table 47 shows the results of evaluation of the electric characteristics..

TABLE 46

| Sample No. | Sintering temperature (°C.) | ZnO (part by wt) | $Bi_2O_3/Sb_2O_3/Cr_2O_3/B_2O_3$ Synthetic fine particles | | | CoO (part by wt) | $MnO_2$ (part by wt) | $Al_2O_3$ (part by wt) |
| | | | $Bi_2O_3$ $/Sb_2O_3$ (part by wt) (*) | $Bi_2O_3$ $/Cr_2O_3$ (part by wt) () | $Bi_2O_3$ $/B_2O_3$ (part by wt) (*) | | | |
|---|---|---|---|---|---|---|---|---|
| 1701 | 800 | 100.0 | 3.0 | 0.3 | 0.3 | 0.80 | 0.40 | 0.0013 |
| 1702 | 850 | 100.0 | 3.0 | 0.3 | 0.3 | 0.80 | 0.40 | 0.0013 |
| 1703 | 900 | 100.0 | 3.0 | 0.3 | 0.3 | 0.80 | 0.40 | 0.0013 |
| 1704 | 1000 | 100.0 | 3.0 | 0.3 | 0.3 | 0.80 | 0.40 | 0.0013 |
| 1705 | 1050 | 100.0 | 3.0 | 0.3 | 0.3 | 0.80 | 0.40 | 0.0013 |
| 1706 | 1100 | 100.0 | 3.0 | 0.3 | 0.3 | 0.80 | 0.40 | 0.0013 |

(*)Heat treatment of a mixture $Bi_2O_3:Sb_2O_3$ = 85:15 (weight ratio)
(**)Heat treatment of a mixture $Bi_2O_3:Cr_2O_3$ = 75:25 (weight ratio)
(***)Heat treatment of a mixture $Bi_2O_3:B_2O_3$ = 93:7 (weight ratio)

TABLE 47

| Sample No. | $V_{1\,mA/mm}$ (V) | $0.1^\alpha$ 1 mA | Rate of change in DC loading $\Delta V_{1\,mA}/V_{1\,mA}(\%)$ | Rate of change in surge $\Delta V_{1\,mA}/V_{1\,mA}(\%)$ |
| --- | --- | --- | --- | --- |
| 1701 | 400 ~ 425 | 65 ~ 70 | −4 ~ −1 | −3 ~ +1 |
| 1702 | 315 ~ 335 | 55 ~ 65 | −4 ~ −1 | −3 ~ 0 |
| 1703 | 305 ~ 330 | 52 ~ 62 | −3 ~ +2 | −3 ~ +1 |
| 1704 | 300 ~ 315 | 55 ~ 62 | −2 ~ +1 | −3 ~ 0 |
| 1705 | 300 ~ 325 | 52 ~ 61 | −2 ~ 0 | −2 ~ +1 |
| 1706 | 295 ~ 315 | 52 ~ 58 | −2 ~ +2 | −2 ~ 0 |

As is apparent from Tables 46 and 47, the zinc oxide varistor produced from the ceramics of this example as a result of sintering at a temperature of 800° to 1100° C. had a high threshold voltage and the absolute value of the rate of change A $V_{1mA}/V_{1mA}$ in the threshold voltage $V_{1mA}$ was 5% or less for long-time DC loading and surge so that great reliability could be obtained. As shown in Table 47, the electric characteristics within the batches had a small variation.

When the zinc oxide varistor was produced from the ceramics of this example, the variation in the electric characteristics between the batches was small, similarly to the variation in the electric characteristics within the batches, which is not shown in Table 47. While a sample using conventional compositions which are not heat treated had a process capability index of 1.0 or less with a standard range of ±5% of $V_{1mA}$ in a method according to the prior art, the process capability index for the present invention was increased to 1.33. As a result, while the sample using conventional method and compositions which are not heat treated had a yield of 90%, the yield was considerably increased to 95% in the present example.

(Example 19)

A bismuth oxide powder (whose average particle size is about 2 to 3 µm) and an antimony oxide fine powder (whose average particle size is about 2 to 3 µm) were mixed at a weight of 70:30. The mixed powder was heat treated at a temperature of 500° C. for 30 mins. in the air. Further, a bismuth oxide powder (whose average particle size is about 2 to 3 µm) and a chromium oxide fine powder (whose average particle size is about 0.5 to 1.5 µm) were mixed at a weight of 60:40. The mixed powder was heated at a temperature of 600° C. for 2 hrs. in the air. Bismuth oxide fine particles (whose average particle size is about 2 to 3 µm) and a boron oxide fine powder (whose average particle size is about 2 to 3 µm) were blended at a weight ratio of 85:15. The blended powder was heat treated at a temperature of 450° C. for 1 hr. These were blended at a weight ratio of 2.5:0.3:0.2, 2.5 0.2:0.3, 2.5:0.1:0.4, 2.0:0.6:0.4, 2.0:0.4:0.6, 2.0:0.2:0.8, 1.5:1.0:0.5, 1.5:0.5:1.0 and ground fine. Consequently, eight kinds of $Bi_2O_3/Sb_2O_3/Cr_2O_3/B_2O_3$ synthetic powders (whose average particle size is about 2 to 3 µm) were obtained.

A zinc oxide powder, the $Bi_2O_3/Sb_2O_3/Cr_2O_3/B_2O_3$ synthetic powder, a cobalt oxide powder (whose average particle size is about 0.5 to 1.5 µm), and a manganese dioxide powder (whose average particle size is about 2 to 3 µm) were blended at a weight ratio of 100:3.0:0.50:0.50. The blended powder was mixed and ground by a wet method. The powder thus obtained was dried and mixed with an aluminum nitrate solution which contains 0.0020 part by weight of aluminum oxide, based on $Al_2O_3$ conversion, for 100 parts by weight of zinc oxide, and then compressed and molded into a disk. The temperature of the molded body thus obtained was raised at a rate of 300° C./hr in the air. The molded body was held at a temperature of 1000° C. for 1 hr. and then its temperature was lowered at a rate of 100° C./hr so that a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 48 shows the composition of samples, and Table 49 shows the results of evaluation of the electric characteristics.

TABLE 48

| Sample No. | ZnO (part by wt) | $Bi_2O_3$ /$Sb_2O_3$ (part by wt) (*) | $Bi_2O_3$ /$Cr_2O_3$ (part by wt) () | $Bi_2O_3$ /$B_2O_3$ (part by wt) (*) | CoO (part by wt) | $MnO_2$ (part by wt) | $Al_2O_3$ (part by wt) |
| --- | --- | --- | --- | --- | --- | --- | --- |
| 1801 | 100.0 | 2.5 | 0.30 | 0.20 | 0.50 | 0.50 | 0.0020 |
| 1802 | 100.0 | 2.5 | 0.20 | 0.30 | 0.50 | 0.50 | 0.0020 |
| 1803 | 100.0 | 2.5 | 0.10 | 0.40 | 0.50 | 0.50 | 0.0020 |
| 1804 | 100.0 | 2.0 | 0.60 | 0.40 | 0.50 | 0.50 | 0.0020 |
| 1805 | 100.0 | 2.0 | 0.40 | 0.60 | 0.50 | 0.50 | 0.0020 |
| 1806 | 100.0 | 2.0 | 0.20 | 0.80 | 0.50 | 0.50 | 0.0020 |
| 1807 | 100.0 | 1.5 | 1.00 | 0.50 | 0.50 | 0.50 | 0.0020 |
| 1808 | 100.0 | 1.5 | 0.50 | 1.00 | 0.50 | 0.50 | 0.0020 |

(Header note: $Bi_2O_3/Sb_2O_3/Cr_2O_3/B_2O_3$ Synthetic fine particles)

(*)Heat treatment of a mixture $Bi_2O_3:Sb_2O_3 = 85:15$ (weight ratio)
(**)Heat treatment of a mixture $Bi_2O_3:Cr_2O_3 = 75:25$ (weight ratio)
(***)Heat treatment of a mixture $Bi_2O_3:B_2O_3 = 93:7$ (weight ratio)

TABLE 49

| Sample No. | $V_{1\,mA/mm}$ (V) | $0.1^\alpha$ 1 mA | Rate of change in DC loading $\Delta V_{1\,mA}/V_{1\,mA}(\%)$ | Rate of change in surge $\Delta V_{1\,mA}/V_{1\,mA}(\%)$ |
| --- | --- | --- | --- | --- |
| 1801 | 215 ~ 280 | 42 ~ 48 | −4 ~ 0 | −3 ~ −1 |
| 1802 | 195 ~ 220 | 45 ~ 60 | −3 ~ −1 | −2 ~ +1 |
| 1803 | 205 ~ 230 | 50 ~ 60 | −1 ~ +2 | −2 ~ 0 |
| 1804 | 210 ~ 225 | 45 ~ 55 | −2 ~ 0 | −2 ~ +2 |
| 1805 | 190 ~ 215 | 55 ~ 62 | −3 ~ −1 | −3 ~ −1 |
| 1806 | 201 ~ 215 | 48 ~ 56 | 0 ~ +3 | −1 ~ +3 |
| 1807 | 170 ~ 195 | 53 ~ 63 | −2 ~ +1 | −2 ~ +1 |
| 1808 | 185 ~ 205 | 53 ~ 62 | −1 ~ +3 | −1 ~ +4 |

As is apparent from Tables 48 and 49, the zinc oxide varistor produced by the method according to the present invention had a great a value and the absolute value of the rate of change A $V_{1mA}/V_{1mA}$ in the threshold voltage $V_{1mA}$ was 5% or less for long-time DC loading and surge so that great reliability could be obtained.

(Example 20)

A bismuth oxide powder (whose average particle size is about 2 to 3 µm), an antimony oxide powder (whose average particle size is about 2 to 3 µm) and a boron oxide fine powder (whose average particle size is about 2 to 3 µm) were mixed at a weight of 97.5:2:0.5. The mixed powder was heat treated at a temperature of 450° C. for 5 hrs. in the air. Further, a bismuth oxide powder a chromium oxide fine powder (whose average particle size is about 0.5 to 1.5 µm) were mixed at a weight ratio of 75:25. The mixed powder was heat treated at a temperature of 550° C. for 5 hrs. These were blended at a weight ratio of 10:1 and ground fine. Consequently, a synthetic powder of bismuth oxide/ antimony oxide/chromium oxide (whose average particle size is about 2 to 3 µm) was obtained.

A zinc oxide powder, the bismuth oxide/antimony oxide/ chromium oxide synthetic powder, a cobalt oxide powder (whose average particle size is about 0.5 to 1.5 µm), and a manganese dioxide powder (whose average particle size is about 2 to 3 µm) were blended at a weight ratio of 100:3.3:0.80:0.40. The blended powder was mixed and ground by a wet method. The powder thus obtained was dried and mixed with an aluminum nitrate solution which contains 0.0013 part by weight of aluminum oxide, based on $Al_2O_3$ conversion, for 100 parts by weight of zinc oxide, and then compressed and molded into a disk. The temperature of the molded body thus obtained was raised at a rate of 150° C./hr in the air. The molded body was held at a temperature of 900° C. for 15 hrs. and then its temperature was lowered at a rate of 50° C./hr so that a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 50 shows the composition of samples, and Table 51 shows the results of evaluation of the electric characteristics.

TABLE 50

| Sample No. | ZnO (part by wt) | $Bi_2O_3/Sb_2O_3$ /$Cr_2O_3/B_2O_3$ Synthetic fine particles (Part by wt) | CoO (part by wt) | $MnO_2$ (part by wt) | $Al_2O_3$ (part by wt) |
| --- | --- | --- | --- | --- | --- |
| 1901 | 100.0 | 3.0 | 0.8 | 0.4 | 0.0013 |

TABLE 51

| Sample No. | $V_{1 mA/mm}$ (V) | Rate of change in DC loading $0.1^\alpha$ 1 mA $\Delta V_{1 mA}/V_{1 mA}$(%) | Rate of change in surge $\Delta V_{1 mA}/V_{1 mA}$(%) |
| --- | --- | --- | --- |
| 1901 | 225 ~ 235 | 45 ~ 55  +1 ~ +1 | −5 ~ −1 |

As is apparent from Tables 50 and 51, the zinc oxide varistor produced by the method according to the present invention had a high threshold voltage and the absolute value of the rate of change $\Delta V_{1mA}/V_{1mA}$ in the threshold voltage $V_{1mA}$ was 5% or less for long-time DC loading and surge so that great reliability could be obtained. As shown in Table 51, the electric characteristics within the batches had a small variation.

When the zinc oxide varistor was produced by the method according to this example, the variation in the electric characteristics between the batches was small, similarly to the variation in the electric characteristics within the batches, which is not shown in Table 51. Thus, the product yield was enhanced considerably.

(Example 21)

A bismuth oxide powder (whose average particle size is about 2 to 3 µm), an antimony oxide fine powder (whose average particle size is about 2 to 3 µm), and a chromium oxide powder (whose average particle size is about 0.5 to 1.5 µm) were mixed at a weight ratio of 85:10:5. The mixed powder was heat treated at a temperature of 500° C. for 1 hr. Further, bismuth oxide fine particles and a boron oxide fine powder (whose average particle size is about 2 to 3 µm) were mixed at a weight ratio of 93:7. The mixed powder was heat treated at a temperature of 600° C. for 10 mins. These were blended at a weight ratio of 8:2 and ground fine to obtain a synthetic powder of bismuth oxide/antimony oxide/ chromium oxide/boron oxide (whose average particle size is about 2 to 3 µm).

A zinc oxide powder, the bismuth oxide/antimony oxide/ chromium oxide synthetic powder, a cobalt oxide powder (whose average particle size is about 0.5 to 1.5 µm), and a manganese dioxide powder (whose average particle size is 2 to 3 µm) were blended at a weight ratio of 100:4.0:0.50:0.50. The blended powder was mixed and around by a wet method. The powder thus obtained was dried and mixed with an aluminum nitrate solution to thereby contain 0.0013 part by weight of aluminum, based on $Al_2O_3$ conversion, for 100 parts by weight of zinc oxide, and then compressed and molded into a disk. The temperature of the molded body thus obtained was raised at a rate of 150° C./hr in the air. The molded body was held at a temperature of 900° C. for 12 hrs. and then its temperature was lowered at a rate of 50° C./hr so that a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 52 shows the composition of samples, and Table 53 shows the results of evaluation of the electric characteristics.

TABLE 52

| Sample No. | ZnO (part by wt) | $Bi_2O_3/Sb_2O_3$ /$Cr_2O_3/B_2O_3$ Synthetic fine particles (Part by wt) | CoO (part by wt) | $MnO_2$ (part by wt) | $Al_2O_3$ (part by wt) |
| --- | --- | --- | --- | --- | --- |
| 2001 | 100.0 | 4.0 | 0.5 | 0.5 | 0.0013 |

TABLE 53

| Sample No. | $V_{1 mA/mm}$ (V) | Rate of change in DC loading $0.1^\alpha$ 1 mA $\Delta V_{1 mA}/V_{1 mA}$(%) | Rate of change in surge $\Delta V_{1 mA}/V_{1 mA}$(%) |
| --- | --- | --- | --- |
| 2001 | 195 ~ 220 | 45 ~ 55  −3 ~ +1 | 0 ~ +4 |

As is apparent from Tables 52 and 53, the zinc oxide varistor produced by the method according to the present invention had a great a value and the absolute value of the rate of change $\Delta V_{1mA}/V_{1mA}$ in the threshold voltage $V_{1mA}$ was 5% or less for long-time DC loading and surge so that great reliability could be obtained.

(Example 22)

A bismuth oxide powder (whose average particle size is about 2 to 3 µm) and an antimony oxide fine powder (whose average particle size is about 2 to 3 µm) were mixed at a weight ratio of 85:15. The mixed powder was heat treated at a temperature of 550° C. for 5 hrs. Further, a bismuth oxide powder (whose average particle size is about 2 to 3 µm), a chromium oxide fine powder (whose average particle size is about 0.5 to 1.5 µm) and a boron oxide powder (whose average particle size is about 2 to 3 µm) were mixed at a weight ratio of 93:2:4. The mixed powder was heat treated at a temperature of 500° C. for 1 hr. The mixed powder which was heat treated was ground fine to obtain a synthetic powder of bismuth oxide/antimony oxide/chromium oxide/ boron oxide (whose average particle size is about 2 to 3 µm).

A zinc oxide (ZnO) powder, the bismuth oxide/antimony oxide/chromium oxide/boron oxide synthetic powder, a cobalt oxide (CoO) powder (whose average particle size is about 0.5 to 1.5 µm), and a manganese dioxide ($MnO_2$) powder (whose average particle size is about 2 to 3 µm) were blended at a weight ratio of 100:4.0:0.954:0.414 while changing the amount of the bismuth oxide/antimony oxide/ chromium oxide/boron oxide synthetic powder. The blended powder was mixed and ground by a wet method. The ground powder was dried, and compressed and molded into a disk. The temperature of the molded body thus obtained was raised at a rate of 150° C./hr in the air, held for 2 hrs. at a temperature of 900° C. and lowered al a rate of 50° C./hr. Consequently, a sintered body was obtained. The sintered body had a thickness of 1.2 mm and a diameter of 14 mm.

A zinc oxide varistor was obtained by a method similar to Example 8. The electric characteristics of the zinc oxide varistor thus obtained were evaluated by a method similar to Example 8. Table 54 shows the composition of samples, and Table 55 shows the results of evaluation of the electric characteristics.

TABLE 54

| Sample No. | ZnO (part by wt) | $Bi_2O_3/Sb_2O_3$ /$Cr_2O_3$/$B_2O_3$ Synthetic fine particles (Part by wt) | CoO (part by wt) | $MnO_2$ (part by wt) | $Al_2O_3$ (part by wt) |
| --- | --- | --- | --- | --- | --- |
| 2101 | 100.0 | 4.0 | 0.954 | 0.414 | 0.0013 |

TABLE 55

| Sample No. | $V_{1\,mA/mm}$ (V) | Rate of change in DC loading $0.1^\alpha$ 1 mA $\Delta V_{1\,mA}/V_{1\,mA}$(%) | Rate of change in surge $\Delta V_{1\,mA}/V_{1\,mA}$(%) |
| --- | --- | --- | --- |
| 2101 | 230 ~ 250 | 45 ~ 56   −4 ~ 0 | −4 ~ −1 |

As is apparent from Tables 54 and 55, the zinc oxide varistor produced by the method according to the present invention had the absolute value of the rate of change A $V_{1mA}/V_{1mA}$ in the threshold voltage $V_{1mA}$ was 5% or less for the long-time DC loading and surge so that great reliability could be obtained. As shown in Table 55, the electric characteristics within batches had a small variation.

When the zinc oxide varistor was produced by the method according to the present method, the variation in the electric characteristics between the batches was small, similarly to the variation in the electric characteristics within the batches, which is not shown in Table 55. As a result, the product yield could be enhanced considerably.

The invention may be embodied in other forms without departing from the spirit or essential characteristics thereof. The embodiments disclosed in this application are to be considered in all respects as illustrative and not restrictive, the scope of the invention is indicated by the appended claims rather than by the foregoing description, and all changes which come within the meaning and range of equivalency of the claims are intended to be embraced therein.

What is claimed is:

1. A zinc oxide ceramic wherein at least one of boron oxide ($B_2O_3$), chromium oxide ($Cr_2O_3$), germanium oxide ($GeO_2$), lanthanum oxide ($La_2O_3$), magnesium oxide (MgO), niobium oxide ($Nb_2O_5$), neodymium oxide ($Nd_2O_3$), lead oxide (PbO), praseodymium oxide (PrO), antimony oxide ($Sb_2O_3$), silicon oxide ($SiO_2$), tin oxide ($SnO_2$), tantalum oxide ($Ta_2O_5$), tungsten oxide ($WO_3$) and yttrium oxide ($Y_2O_3$) powders is mixed with a bismuth oxide ($Bi_2O_3$) powder, the mixture thus obtained is heat treated preliminarily at a temperature of 400° to 700° C. and ground to prepare a synthetic powder, 0.5 to 20 parts by weight of the synthetic powder and 0.1 to 5.0 parts by weight of at least one of nickel oxide, cobalt oxide and manganese oxide powders being added to 100 parts by weight of a zinc oxide powder, and sintered at a temperature of 750° to 1100° C.

2. The zinc oxide ceramic as defined in claim 1, wherein a part of zinc oxide is replaced with magnesium oxide.

3. The zinc oxide ceramic as defined in claim 1, wherein 0.00062 to 0.372 part by weight of aluminum components are present for 100 parts by weight of the zinc oxide powder, based on aluminum oxide conversion.

4. The zinc oxide ceramic as defined in claim 2, wherein 0.00062 to 0.372 part by weight of aluminum components are present for 100 parts by weight of a mixture of the zinc oxide powder and the magnesium oxide powder, based on aluminum oxide conversion.

5. The zinc oxide ceramic as defined in claim 1, wherein the synthetic powder is produced by heat treating a mixture of the bismuth oxide powder and the chromium oxide powder preliminarily.

6. The zinc oxide ceramic as defined in claim 5, wherein a molar ratio of the chromium oxide powder to the bismuth oxide powder in the synthetic powder is 1:1 or more.

7. The zinc oxide ceramic as defined in claim 1, wherein the synthetic powder contains a bismuth oxide powder (A) and a boron compound (B) selected from boron oxide ($B_2O_3$) and boric acid ($H_3BO_3$).

8. The zinc oxide ceramic as defined in claim 7, wherein a molar ratio of the bismuth oxide powder (A) and the boron compound (B) selected from boron oxide ($B_2O_3$) to boric acid ($H_3BO_3$) in the synthetic powder is 80:20 to 20:80.

9. A method for producing a zinc oxide ceramic comprising the steps of:

mixing at least one of boron oxide ($B_2O_3$), chromium oxide ($Cr_2O_3$), germanium oxide ($GeO_2$), lanthanum oxide ($La_2O_3$), magnesium oxide (MgO), niobium oxide ($Nb_2O_5$), neodymium oxide ($Nd_2O_3$), lead oxide (PbO), praseodymium oxide (PrO), antimony oxide ($Sb_2O_3$), silicon oxide ($SiO_2$), tin oxide ($SnO_2$), tantalum oxide ($Ta_2O_5$), tungsten oxide ($WO_3$) and yttrium oxide ($Y_2O_3$) powders with a bismuth oxide ($Bi_2O_3$) powder;

preliminarily heat treating the mixture at a temperature of 400° to 700° C.;

grinding the heat treated mixture to prepare a synthetic powder or a mixed synthetic powder; and adding 0.5 to 20 parts by weight of the synthetic powder and 0.1 to 5.0 parts by weight of at least one of nickel oxide, cobalt oxide and manganese oxide powders to 100 parts by weight of zinc oxide and sintering at a temperature of from 750° to 1100° C.

10. The method for producing a zinc oxide ceramic as defined in claim 9, further comprising the step of adding magnesium oxide to zinc oxide prior to adding the synthetic powder to obtain a zinc oxide—magnesium oxide mixed powder.

11. The method for producing a zinc oxide ceramic as defined in claim 9, further comprising the step of including aluminum components by using 0.00062 to 0.372 part by weight of an aluminum salt solution for 100 parts by weight of the zinc oxide powder or 100 parts by weight of a mixture of the zinc oxide powder and magnesium oxide powder, based on aluminum oxide conversion.

12. The method for producing a zinc oxide ceramic as defined in claim 9, wherein the synthetic powder is obtained by heat treating the mixture of the bismuth oxide powder, the antimony oxide powder and at least one of boron oxide ($B_2O_3$) and boric acid ($H_3BO_3$) powders at a temperature of 400° to 700° C. so as to be ground.

13. The method for producing a zinc oxide ceramic as defined in claim 10, wherein the synthetic powder is obtained by heat treating the mixture of the bismuth oxide powder, the antimony oxide powder and the chromium oxide powder at a temperature of 400° to 700° C. so as to be ground.

14. The method for producing a zinc oxide ceramic as defined in claim 9, wherein the synthetic powder is obtained by heat treating the mixture of the bismuth oxide powder, the antimony oxide powder, the chromium oxide powder, and at least one of the boron oxide ($B_2O_3$) powder and the boric acid ($H_3BO_3$) powder at a temperature of 400° to 700° C. so as to be ground.

15. The method for producing a zinc oxide ceramic as defined in claim 9, wherein two kinds of synthetic powders are obtained by heat treating the mixture of the bismuth oxide powder and the antimony oxide powder at a temperature of 400° to 700° C. to be ground and by heat treating the mixture of the bismuth oxide powder and at least one of the boron oxide ($B_2O_3$) powder and the boric acid ($H_3BO_3$) powder at a temperature of 400° to 700° C. to be ground.

16. The method for producing a zinc oxide ceramic as defined in claim 9, wherein two kinds of synthetic powders are obtained by heat treating the mixture of the bismuth oxide powder and the antimony oxide powder at a temperature of 400° to 700° C. so as to be ground and by heat treating the mixture of the bismuth oxide powder and the chromium oxide powder at a temperature of 400° to 700° C. so as to be ground.

17. The method for producing a zinc oxide ceramic as defined in claim 9, wherein three kinds of synthetic powders are obtained by heat treating the mixture of the bismuth oxide powder and the antimony oxide powder at a temperature of 400° to 700° C. so as to be ground, by heat treating the mixture of the bismuth oxide powder and at least one of the boron oxide ($B_2O_3$) powder and the boric acid ($H_3BO_3$) powder at a temperature of 400° to 700° C. so as to be ground, and by heat treating the mixture of the bismuth oxide powder and the chromium oxide powder at a temperature of 400° to 700° C. to be ground.

18. The method for producing a zinc oxide ceramic as defined in claim 9, wherein two kinds of synthetic powders are obtained by heat treating the mixture of the bismuth oxide powder, the antimony oxide powder and the chromium oxide powder at a temperature of 400° to 700° C. so as to be ground, and by heat treating the mixture of the bismuth oxide powder and at least one of the boron oxide ($B_2O_3$) powder and the boric acid ($H_3BO_3$) powder at a temperature of 400° to 700° C. so as to be ground.

19. The method for producing a zinc oxide ceramic as defined in claim 9, wherein two kinds of synthetic powders are obtained by heat treating the mixture of the bismuth oxide powder, the antimony oxide powder and at least one of the boron oxide ($B_2O_3$) powder and the boric acid ($H_3BO_3$) powder at a temperature of 400° to 700° C. so as to be ground, and by heat treating the mixture of the bismuth oxide powder and the chromium oxide powder at a temperature of 400° to 700° C. to be ground.

20. The method for producing a zinc oxide ceramic as defined in claim 9, wherein two kinds of synthetic powders are obtained by heat treating the mixture of the bismuth oxide powder and the antimony oxide powder at a temperature of 400° to 700° C. to be ground, and by heat treating the mixture of the bismuth oxide powder, the chromium oxide powder and at least one of the boron oxide ($B_2O_3$) powder and the boric acid ($H_3BO_3$) powder at a temperature of 400° to 700° C. so as to be ground.

21. The method for producing a zinc oxide ceramic as defined in claim 9, wherein 0.00062 to 0.372 part by weight of aluminum components is added for 100 parts by weight of a zinc oxide varistor, based on aluminum oxide conversion, to the powder material whose main component is the zinc oxide powder to which the synthetic powder is added.

22. The method for producing a zinc oxide ceramic as defined in claim 13, wherein a molar ratio of the chromium oxide powder to the bismuth oxide powder in the synthetic powder obtained by heat treating the mixture of the bismuth oxide powder and the chromium oxide powder at a temperature of 400° to 700° C. so as to be ground is 1:1 or more.

23. The method for producing a zinc oxide ceramic as defined in claim 15, wherein a molar ratio of the bismuth oxide powder to at least one of the boron oxide ($B_2O_3$) powder and the boric acid ($H_3BO_3$) powder is 80:20 to 20:80 in the synthetic powder obtained by heat treating the mixture of the bismuth oxide powder and at least one of the boron oxide ($B_2O_3$) powder and the boric acid ($H3BO_3$) powder at a temperature of 400° to 700° C. so as to be ground.

24. A zinc oxide varistor wherein at least one of boron oxide ($B_2O_3$), chromium oxide ($Cr_2O_3$), germanium oxide ($GeO_2$), lanthanum oxide ($La_2O_3$), magnesium oxide (MgO), niobium oxide ($Nb_2O_5$), neodymium oxide ($Nd_2O_3$), lead oxide (PbO), praseodymium oxide (PrO), antimony oxide ($Sb_2O_3$), silicon oxide ($SiO_2$), tin oxide ($SnO_2$), tantalum oxide ($Ta_2O_5$), tungsten oxide ($WO_3$) and yttrium oxide ($Y_2O_3$) powder is mixed with a bismuth oxide ($Bi_2O_3$) powder, the mixture thus obtained is heat treated preliminarily at a temperature of 400° to 700° C. and ground to prepare a synthetic powder, 0.5 to 20 parts by weight of the synthetic powder and 0.1 to 5.0 parts by weight of at least one of nickel oxide, cobalt oxide and manganese oxide being added to 100 parts by weight of a zinc oxide powder and sintered at a temperature of 750° to 1100° C.

25. The zinc oxide varistor as defined in claim 24, wherein silver is integrally sintered as an internal electrode of the varistor.

* * * * *